United States Patent
Li et al.

(10) Patent No.: US 11,897,165 B2
(45) Date of Patent: Feb. 13, 2024

(54) PRODUCTION LINE OF CA ABRASIVE

(71) Applicants: QINGDAO UNIVERSITY OF TECHNOLOGY, Shandong (CN); QINGDAO SISA ABRASIVES CO., LTD., Shandong (CN)

(72) Inventors: Changhe Li, Qingdao (CN); Baoteng Huang, Qingdao (CN); Han Zhai, Qingdao (CN); Bingheng Lu, Qingdao (CN); Huajun Cao, Qingdao (CN); Zhen Wang, Qingdao (CN); Naiqing Zhang, Qingdao (CN); Min Yang, Qingdao (CN); Yanbin Zhang, Qingdao (CN); Yali Hou, Qingdao (CN); Runze Li, Qingdao (CN); Xin Cui, Qingdao (CN); Mingzheng Liu, Qingdao (CN); Teng Gao, Qingdao (CN); Xiaoming Wang, Qingdao (CN)

(73) Assignees: QINGDAO UNIVERSITY OF TECHNOLOGY, Shandong (CN); QINGDAO SISA ABRASIVES CO., LTD., Shandong (CN)

( * ) Notice: Subject to any disclaimer, the term of this patent is extended or adjusted under 35 U.S.C. 154(b) by 499 days.

(21) Appl. No.: 17/281,895

(22) PCT Filed: Oct. 30, 2019

(86) PCT No.: PCT/CN2019/114461
§ 371 (c)(1),
(2) Date: Mar. 31, 2021

(87) PCT Pub. No.: WO2021/056681
PCT Pub. Date: Apr. 1, 2021

(65) Prior Publication Data
US 2021/0339426 A1 Nov. 4, 2021

(30) Foreign Application Priority Data
Sep. 27, 2019 (CN) .................... 201910926752.3

(51) Int. Cl.
*B28B 5/02* (2006.01)
*B28B 7/36* (2006.01)
(Continued)

(52) U.S. Cl.
CPC .............. *B28B 5/021* (2013.01); *B28B 7/36* (2013.01); *B28B 11/243* (2013.01); *C09K 3/1409* (2013.01)

(58) Field of Classification Search
CPC ......... B28B 5/021; B28B 7/36; B28B 11/243; C09K 3/1409
See application file for complete search history.

(56) References Cited

U.S. PATENT DOCUMENTS 5,500,273 A * 3/1996 Holmes ................ C09K 3/1409
51/298
2015/0344758 A1* 12/2015 Wang ..................... B24D 3/008
51/309

FOREIGN PATENT DOCUMENTS

CN 1126454 A 7/1996
CN 103317451 A 9/2013
(Continued)

OTHER PUBLICATIONS

Jun. 23, 2020 Search Report issued in International Patent Application No. PCT/CN2019/114461.
(Continued)

*Primary Examiner* — Robert B Davis
(74) *Attorney, Agent, or Firm* — JCIPRNET

(57) ABSTRACT

A production line of a CA abrasive, including: a belt mold, the belt mold being provided with a cavity; a transmission device, configured to drive the belt mold to run; a slurry
(Continued)

coating mechanism, configured to coat a slurry on a surface and into the cavity of the belt mold; a slurry scraping mechanism, configured to scrap the slurry coated on the surface of the belt mold into the cavity; a drying mechanism, configured to dry the belt mold so that the slurry is dried and precipitated into abrasive grains; a separation mechanism, arranged below the drying mechanism and configured to shake down the abrasive grains in the cavity of the belt mold by vibrating; a sweeping mechanism, configured to sweep slurry fragments of the belt mold after separation; and a release agent coating mechanism, configured to spray a release agent to the swept belt mold.

9 Claims, 15 Drawing Sheets

(51) Int. Cl.
  *B28B 11/24* (2006.01)
  *C09K 3/14* (2006.01)

(56) References Cited

FOREIGN PATENT DOCUMENTS

| | | |
|---|---|---|
| CN | 106163743 A | 11/2016 |
| CN | 107530864 A | 1/2018 |
| CN | 109048701 A | 12/2018 |
| CN | 110000718 A | 7/2019 |
| KR | 101698989 B1 | 1/2017 |
| WO | WO-2015164211 A1 * 10/2015 | ............. B24D 11/00 |

OTHER PUBLICATIONS

Jun. 23, 2020 Written Opinion issued in International Patent Application No. PCT/CN2019/114461.

* cited by examiner

PRODUCTION LINE OF CA ABRASIVE

BACKGROUND

Technical Field

The present disclosure belongs to the technical field of abrasive production, and particularly relates to a production line of a CA abrasive.

Related Art

A ceramic corundum abrasive is a high-purity corundum abrasive which is synthesized by a unique ceramic technology and has a fine crystal structure. There are two typical manufacturing processes for the ceramic corundum abrasive, wherein one typical manufacturing process refers to manufacturing the abrasive by synthesizing through a sol-gel process and sintering. Specifically, raw materials are made into hydrosol first, and then the hydrosol is gelled, dried, pre-crushed, granulated, and screened to form certain grain shape and size, and finally, grains are calcined and sintered into an abrasive with high toughness and hardness. The raw materials may be a boehmite or other aluminum media, and $Fe_2O_3$ and other nucleating substances may be added during manufacturing to promote formation of a crystal nucleus and reduce a crystal transformation temperature. Meanwhile, a crystal growth inhibitor (such as $TO_2$, MgO, $ZO_2$, etc.) may be added to reduce growth of crystal grains, so as to achieve a fine-grained structure. Gel obtained may be pressed or extruded into a compact solid, thus ensuring a uniformity of the sintered abrasive. At present, the process is widely used in the world to prepare the abrasive. The other typical manufacturing process refers to manufacturing the abrasive by grinding, extruding, granulating, drying, and sintering $\alpha$-$Al_2O_3$.

China has taken the lead in successfully developing the abrasive, with a code name CA. Compared with foreign manufacturing processes, the preparation process of novel ceramic corundum abrasive grains developed by China is simpler and more reasonable and has a higher production efficiency and a lower production cost. All procedures from raw material treatment to granulation and sintering have obvious creativity and advancement.

The ceramic corundum abrasive is different from an ordinary corundum abrasive in a manufacturing method, so that structures and properties of the abrasives are quite different. Specific embodiments are shown in the following aspects.

(1) In the aspect of microstructure, each abrasive grain of an ordinary electrofused corundum abrasive only contains a small amount of single crystals (sometimes only one single crystal), and a size of the crystals is about 50 μm or larger. However, each abrasive grain of the new ceramic corundum abrasive is composed of thousands of submicron or micron-sized fine crystals, a size of the crystals of the abrasive grain is $1/15$ to $1/200$ of that of the crystals of the ordinary corundum abrasive grain, and these large numbers of fine abrasive grains make the abrasive grains have a lot of sharp cutting edges.

(2) In the aspect of toughness, due to different microstructures, the abrasives are different in a fracture behavior of the abrasive grains. The abrasive grains of the new ceramic corundum abrasive show an intergranular fracture failure, while the abrasive grains of the traditional electrofused corundum abrasive show a transgranular fracture failure.

Therefore, the toughness of the new ceramic corundum abrasive is obviously higher than, generally about one times, that of the ordinary electrofused corundum abrasive. Hardness and toughness of several abrasives are shown in Table 2.

(3) In the aspect of wear mechanism and self-sharpening, the abrasive grains of the traditional electrofused corundum abrasive are flattened and passivated after being worn away at a working point. Under the action of a grinding force, these passivated abrasive grains either fall off from a grinding tool, or are transgranularly fractured along a crystal plane, showing a macroscopic fracture, thus having greater abrasive grain loss.

However, when the abrasive grains of the new ceramic corundum abrasive are fractured after being worn, the fracture occurs along a grain boundary, showing a microscopic fracture and rarely producing the macroscopic fracture, thus having less abrasive grain loss, less wear, and a longer service life. A whole wear process of the abrasive grains of the new ceramic corundum abrasive is also a self-sharpening process of the abrasive grains themselves. During the effective service life, passivated fine crystal grains (which are namely the cutting edges) on surface layers of the abrasive grains gradually fall off from the abrasive grains under the action of the grinding force, and new micro-cutting edges are constantly exposed, so that the abrasive grains are always in a sharp state, thus ensuring the self-sharpening function of the grinding tool and the stability of a grinding performance. Therefore, compared with the ordinary electrofused corundum abrasive, the new ceramic corundum abrasive has better self-sharpening performance and wearing resistance.

Since the new ceramic corundum abrasive has excellent characteristics in structure, toughness, wear characteristic, and self-sharpening, the new ceramic corundum abrasive has the following advantages in the grinding performance.

(1) Sharp abrasive grains, a strong cutting ability, and a high grinding efficiency are achieved. Deep cutting, large feeding, heavy loading, and high-efficiency grinding can be carried out. According to relevant tests, a single-stroke feed rate may reach 0.25 mm, and a metal removal rate may be higher than that of an ordinary corundum grinding wheel by more than 50%.

(2) Good self-sharpening is achieved, less grinding heat is produced, a grinding temperature is low, and no workpiece is burnt.

(3) Good toughness, less wear, and good shape retention of the grinding wheel are achieved, the new ceramic corundum abrasive is used for precision grinding and forming grinding, and it is easy to obtain a high dimensional accuracy and a dimensional shape consistency.

(4) The grinding wheel has a high durability, a long service life (reaching 2 to 10 times of that of the ordinary corundum grinding wheel), and a less replacement frequency, and auxiliary processing time and downtime are reduced, thus being beneficial for using a numerical control automatic machine tool and implementing automatic production.

(5) The grinding wheel has good self-sharpening without blockage, and can keep a stable grinding performance, thus reducing a dressing amount (1/21/3 of that of the ordinary corundum grinding wheel), reducing dressing times (by 80%), prolonging a dressing interval, reducing the downtime and the auxiliary processing time, and improving a production efficiency.

(6) The new ceramic corundum abrasive is far superior to the ordinary electrofused corundum abrasive in performance, and a price of the new ceramic corundum abrasive is far lower than those of a CBN and a diamond abrasive, while a hardness of the new ceramic corundum abrasive is similar to that of the ordinary corundum abrasive, so that there is no need to adopt special grinding equipment and dressing device, there is no special requirement of the CBN and the diamond for grinding equipment, there is no difficulty in dressing, and there is no special requirement for a grinding fluid like a CBN grinding wheel. Therefore, the new ceramic corundum abrasive is easy to be popularized and applies.

Therefore, industrial production of the CA abrasive is very important for prolonging a service life of the grinding wheel, improving a surface quality of a workpiece, and promoting innovation of the grinding wheel. Industrial production of the CA abrasive is different from a traditional manufacturing process of the CA abrasive, wherein a link of abrasive grain fracture is reduced, abrasive grains with a fixed shape need to be produced from a gelled slurry through a certain procedure first, and then dried abrasive grains are collected into a stock bin through drying, collecting and other procedures. If the production process needs to be circulating and sustainable, it is necessary to replenish the abrasive grain slurry to a production line in time, clean the production line in time, and provide a circulating transmission device. The circulating transmission device of the production line of the CA abrasive is different from an ordinary belt conveyor, and a higher requirement is put forward for the transmission device of the production line of the CA abrasive. In order to improve the leveling effect, a belt mold needs a flat and stable supporting device in the slurry leveling process. The belt mold should avoid friction with the transmission device to the greatest extent to prevent damage to the belt mold.

Chen Qingwen invented a belt conveyor, which includes a frame, a driving roller and a driven roller arranged on the frame, and belts sleeved on the driving roller and driven roller, wherein the driving roller is driven by a motor, skirt edges for blocking materials are arranged on two sides of a conveying surface of the belt, an anti-deviation structure is arranged between the belt as well as the driving roller and the driven roller, the anti-deviation structure includes a convex edge arranged on an inner surface of the belt, and first grooves which are respectively arranged on outer surfaces of the driving roller and the driven roller and match with the convex edge, the convex edge had an annular shape which extends along a moving direction of the belt and is connected from head to tail, and a sealing cover for covering the belt is detachably arranged on the frame.

The belt conveyor is provided with the anti-deviation structure, which is capable of effectively preventing the belt from deviation even when the belt suffers from heavy load or uneven feeding, so that the stability of belt transmission is ensured, and garbage and sewage are prevented from flowing out from both sides of the belt at the same time. Power is only provided by the motor of the driving roller, and insufficient power may limit the length of the belt. A supporting roller supports the driving roller and the driven roller, which increases the overall weight of the belt conveyor.

Dennis G. Welygan, Charles J. Studiner, IV, Dwight D. Erickson, et al. invented a laser method for making shaped ceramic abrasive particles, shaped ceramic abrasive particles, and abrasive articles. If desired, the cutting pattern may generate multiple shapes of ceramic precursor particles, which may be left in a combined state or which may be separated by shape (for example, by sieving). In some embodiments, the laser may be directed at the layer of ceramic precursor material such that cuts are substantially perpendicular to its exposed surface. In some embodiments, the laser may be directed at the layer of ceramic precursor material such that cuts are substantially at an angle relative to its exposed surface. The scored layer of ceramic precursor material is broken along score lines to provide shaped ceramic precursor particles.

According to this method, abrasives with various shapes can be obtained, with a high production efficiency. However, the costs of laser cutting used in this method are high. The breaking of the ceramic precursor material along the score line to obtain the abrasive results in a rough edge and a poor integrity of the abrasive. It is difficult to dry the layer of ceramic precursor material to a point where cracks (e.g., similar in appearance to mud cracks) begin to form at peripheral regions of the layer. Laser cutting is adopted in place of a belt mold for production, and no specific structure has been provided for mechanisms such as ultrasonic vibration, beater bars, rollers, scrapers, and combinations thereof, resulting in that the separation quality cannot be guaranteed.

SUMMARY

An objective of the present disclosure is to provide a production line of a CA abrasive to overcome the above-mentioned shortcomings of the prior art. According to the production line, six procedures such as the slurry coating, slurry scraping, drying, separation, sweeping and release agent spraying are sequentially carried out, so that a set of circulating production line is formed, and the high automation of CA abrasive grain production is realized.

An invention objective of the present disclosure is to provide a production line of a CA abrasive. To achieve the above objective, the present disclosure employs the following technical solutions.

A production line of a CA abrasive includes:
a belt mold, the belt mold being provided with a cavity;
a transmission device, configured to drive the belt mold to run;
a slurry coating mechanism, configured to coat a slurry on a surface and into the cavity of the belt mold;
a slurry scraping mechanism, configured to scrap the slurry coated on the surface of the belt mold into the cavity;
a drying mechanism, configured to dry the belt mold to so that the slurry is dried and precipitated into abrasive grains;
a separation mechanism, arranged below the drying mechanism and configured to shake down the abrasive grains in the cavity of the belt mold by vibrating;
a sweeping mechanism, configured to sweep slurry fragments of the belt mold after separation; and
a release agent spraying mechanism, configured to spray a release agent to the swept belt mold.

According to the above production line, the belt mold with the cavity is driven to run by the transmission device. During running, the slurry coating mechanism coats the slurry, the slurry scraping mechanism scrapes the slurry on the surface of the belt mold to the cavity, the drying mechanism dries and solidifies the slurry, the separation mechanism shakes down the abrasive grains by vibrating, the sweeping mechanism sweeps the slurry fragments of the belt mold, and the release agent coating mechanism sprays the release agent to the belt mold, thus realizing high automation of CA abrasive grain production and improving industrial production efficiency of the abrasive grains.

As a further technical solution, the transmission device includes:
- a driving roller, configured to drive the belt mold to run;
- a chain plate supporting mechanism, arranged below a feeding part of the annular belt mold to support the belt mold;
- a synchronous belt driving mechanism, arranged below the feeding part of the annular belt mold to support the belt mold; and
- a plurality of tension rolls, arranged above a return part of the annular belt mold to tension the belt mold.

As a further technical solution, the chain plate supporting mechanism includes a plurality of chain plates which are sequentially connected into an annular structure, surfaces of the chain plates are provided with wales, the chain plates are arranged in parallel with the surface of the belt mold, and a plurality of driving wheels are arranged in an annular ring of the annular structure; and
- the synchronous belt driving mechanism includes a plurality of rows of connected synchronous belt mechanisms, each synchronous belt mechanism is provided with a plurality of synchronous belts in parallel, the synchronous belts of the adjacent synchronous belt mechanisms are distributed crosswise, and the synchronous belts are arranged in parallel with the surface of the belt mold.

Through the transmission device as described above, the belt mold can be avoided from the phenomena of abrasive accumulation, uneven coating and adhesion between abrasives, and the transmission device is matched with the coating and scraping mechanisms, so that the belt mold can move stably at a constant speed under the pressure of the scraper.

As a further technical solution, the slurry coating mechanism includes an injector for injecting slurry into the belt mold, the injector can move up, down, left and right, and the injector includes a syringe, a side part of the syringe is provided with a slurry inlet for timely feeding according to the slurry remaining inside the syringe, a bottom side of the syringe is provided with a slurry outlet, an injector piston is arranged in the syringe, the injector piston is connected with a linear propulsion component, and the linear propulsion component is a ball screw nut pair, so that the coating process is stable and fast, and a supply amount of the slurry can be accurately controlled.

The slurry coating mechanism further includes a supporting guide rail of an injector supporting rack, the injector is installed on the guide rail, the guide rails is connected with an injector lifting component, the guide rail is connected with an injector horizontal moving component, and the syringe is connected with the guide rail.

The injector lifting component refers to two sets of screw nut pair lifting mechanisms, screws at left and right sides are respectively connected with a motor fixing block and a synchronous belt positioning block, which can change rotation of the motor into up-and-down movement of the guide rail; the injector horizontal moving component is similarly a screw nut pair horizontal moving mechanism, a screw of the injector horizontal moving component is arranged in parallel with the guide rail, a screw nut of the injector horizontal moving component is an injector supporting slider, and the syringe is connected with the injector supporting slider through a lower framework of the injector.

As a further technical solution, the slurry scraping mechanism includes a scraping master support and a scraping plate, the scraping plate is connected with the scraping master support through a suspension component so that the scraping plate is suspended, and a damping spring is arranged in the suspension component; and
- the scraping plate includes a triangular supporting plate and scrapers fixed at a lower part of the triangular supporting plate, a long side of the triangular supporting plate is arranged along a length direction of the scraping master support; the scrapers are V-shaped scrapers which are arranged at lower parts of the two short sides of the triangular supporting plate; a bottom side of the scraper is a plane, and a longitudinal section of the scraper is a rectangle with one side missing corners, so that a contact shape between a bottom surface of the scraper and the slurry is an inclined surface first and then plane, and the inclined surface can squeeze a slurry-coated layer into the cavity of the belt mold, while the plane can compact and flatten the slurry in each cavity.

The scraper is V-shaped, which can lead the slurry in front of the scraping mechanism to both sides to prevent slurry accumulation to affect filling work. The bottom surface of the scraper is a plane and the bottom surface of the scraper and the belt mold are parallel to each other. The scraper is connected with the triangular supporting plate by a bolt, and the total length of the scraper and the triangular supporting plate may be adjusted by a bolt, so as to control the amount of adjustment for the damping spring.

The suspension component includes a suspension connecting piece connected with the scraping master support, a height of the suspension connecting piece may be adjusted, and the damping spring is arranged below the suspension connecting piece.

Further, the damping spring is arranged in a damping spring seat, a top of the damping spring seat is connected with the suspension connecting piece, and a bottom of the damping spring seat is connected with the scraping plate; and
- the suspension connecting piece includes an outer suspension connecting piece and an inner suspension connecting piece which may be nested in the outer suspension connecting piece, the outer suspension connecting piece is connected with the scraping master support, and a bottom side of the inner suspension connecting piece is connected with the top of the damping spring seat, one of the outer suspension connecting piece or the inner suspension connecting piece is provided with a long hole, while the other is provided with a plurality of bolt holes, and a bolt pass through the long hole and the bolt holes to realize the connection between the outer suspension connecting piece and the inner suspension connecting piece; moreover, height adjustment of the suspension connecting piece is realized by different bolt holes.

As a further technical solution, the drying mechanism includes an oven, the oven includes an inner oven shell and an outer oven shell, the outer oven shell is arranged outside the inner oven shell, and the inner oven shell and the outer oven shell are connected with each other, a cavity is formed between the inner oven shell and the outer oven shell, and the inner oven shell is provided with a ventilation hole, so that an interior of the inner oven shell is communicated with an exhaust mechanism through the ventilation hole and the cavity, the exhaust mechanism is connected with the oven, and the inner oven shell can be arranged across the belt mold for the belt mold to move conveniently; and
- the interior of the inner oven shell is provided with a heat source mechanism, the heat source mechanism is configured to dry CA slurry; a protective cover is installed below the heat source mechanism on an inner surface of the inner oven shell, the protective cover is provided with a protective cover radiating hole, the protective cover is U-shaped and protects the heat source mechanism from a bottom of the heat source mechanism; a plurality of sets of the heat source mechanisms are included, each set is fix on the inner oven shell, and each set of heat source mechanisms includes a plurality of lamps. The lamps are connected with a power supply to generate heat.

According to the drying device, ventilation holes are arranged at top and two sides of the inner oven shell, a plurality of rows of ventilation holes are arranged at two sides of the inner oven shell, and a plurality of sets of ventilation holes are also arranged at the top of the inner oven shell, so that outside air can enter the inner oven shell from two sides of the belt mold (there is a gap between the two sides of the belt mold and the inner oven shell) and an oven port, and volatile substances are volatilized through the cavity and discharged from the oven under setting actions of the exhaust mechanism, thus avoiding direct blowing by fans, and effectively avoiding separation of the abrasive from the cavity, and being also conducive to the discharge of the volatile substances, to avoid damage to the heat source mechanism.

To facilitate securing of the oven, at least one end of the oven is provided with an oven port securing plate, the oven port securing plate is connected with a frame and the oven port securing plate is connected with the outer oven shell; an oven port baffle is installed through the oven port securing plate, a height of the oven port baffle can be adjusted relative to the oven port securing plate to adjust a size of an air inlet at the end of the oven; the oven port baffle is arranged at two sides of the oven, and the oven port baffle is provided with a long hole, so that a fastening and screwing handle passes through the long hole to be connected with the oven port securing plate.

In addition, the exhaust mechanism includes a plurality of centrifugal fans, and a top of the outer oven shell is provided with an opening for installing the centrifugal fans. The centrifugal fans can guide the air flow in the oven and prevent blowing up the CA abrasive in the cavity.

An inner and outer oven shell connecting post is arranged between the inner oven shell and the outer oven shell, two sides of the connecting post are both provided with a threaded hole; inner and outer oven connecting pieces realize connection between the inner oven shell and the inner and outer oven shell connecting post or connection between the outer oven shell and the inner and outer oven shell connecting post; one end of the inner and outer oven shell connecting post is fixedly connected with the outer oven shell or the inner oven shell, thus facilitating the connection between the inner oven shell and the outer oven shell.

As a further technical solution, the separation mechanism includes a rotatable convex piece, and the convex piece can be arranged above the belt mold, so that the convex piece knocks on the belt mold during rotational movement for separation; and the separation mechanism includes at least one set of convex piece separation mechanisms, the convex piece separation mechanism includes a rotating shaft, the rotating shaft is provided with a plurality of convex pieces, and setting angles of two adjacent convex pieces of each camshaft are the same or different; the convex pieces are preferably cams; the cam is vertically arranged with the camshaft, and the convex piece separation mechanism is a cam separation mechanism; and an abrasive grain collecting box is arranged below the separation mechanism.

The separation mechanism further includes a belt mold tensioning mechanism arranged on a side part of the rotating shaft and configured to tension the belt mold, wherein a height of the belt mold tensioning mechanism relative to a frame is adjustable; at least two sets of belt mold tensioning mechanisms are included, each set includes two belt mold tension rolls arranged up and down; the belt mold passes between the two belt mold tension rolls, and the height of the belt mold is adjusted by adjusting heights of the belt mold tension rolls so as to achieve the best effect in the cam separation process.

As a further technical solution, the sweeping mechanism includes a rolling brush and an air blade capable of blowing air to the belt mold and the cavity thereof, the air blade is provided with an air outlet for blowing air, and an angle of the air blade is adjustable; the air outlet blows air toward one side of the belt mold provided with the cavity of the belt mold, and preferably, the air outlet of the air blade can be set at a vertical or inclined angle with the belt mold, so that a length direction of the air outlet is consistent with a width direction of the belt mold; the rolling brush can be rotatably arranged, a rotating direction of the rolling brush is opposite to a moving direction of the belt mold, the rolling brush is arranged at one side of the air blade, the rolling brush is close to a feeding side direction of the belt mold relative to the air blade, and the rolling brush can be arranged below the belt mold and along the width direction of the belt mold, so that the belt mold is swept by the rolling brush first and then swept by the air blade; and the rolling brush can be arranged below the belt mold and can be arranged along the width direction of the belt mold; and an abrasive grain collecting box is arranged below the sweeping mechanism.

An size of the air outlet of the air blade can be adjusted, the air blade includes an air blade cavity, a top of the air blade cavity is provided with an air outlet, two sides of the air outlet of the air blade cavity are provided with air blade air-volume adjusting plates, the air blade air-volume adjusting plates are provided with long holes, so that the size of the air outlet can be adjusted by adjusting positions of the air blade air-volume adjusting plates on the two sides; one side of the air blade cavity is installed on the frame through an air blade securing screw, and the other side is provided with an air blade angle adjusting screw to support the air blade cavity, and the air blade angle adjusting screw is installed on the frame through the long hole to adjust the angle of the air blade.

The sweeping mechanism is arranged at a side part of the separation mechanism, and the separation mechanism is arranged below the oven; compared with the sweeping mechanism, the separation mechanism is closer to the feeding side direction of the belt mold, so that after the slurry is preliminarily dried, separation is carried out, and then the surface and the cavity of the belt mold are effectively swept by the sweeping mechanism.

As a further technical solution, the release agent coating mechanism includes a shell, two sides of the shell are provided with openings for the belt mold to pass through, at least one nozzle for spraying atomized release agent to the belt mold is installed in the shell, the shell is connected with an oil mist collecting mechanism, the oil mist collecting mechanism includes a sucking component arranged in an oil mist collecting box, and one side of the sucking component in the oil mist collecting box is provided with a filter layer; and a bottom of the shell is connected with a recovery mechanism, the recovery mechanism is connected with the oil mist collecting mechanism, the recovery mechanism includes a recovery box, a first filter cotton is arranged in the recovery box, the first filter cotton can move relative to the recovery box, and the recovery box is provided with a first filter cotton moving port, so that unused release agent flows down along a top of the shell after contacting with the top of the shell, and remains at a bottom end of the shell and flows into the recovery box along the bottom of the shell; a concave filter screen is installed above the first filter cotton in the recovery box to filter impurities in the release agent, and the concave filter screen filters the impurities in the release agent in two parts first; and the release agent is filtered twice by the first filter cotton and finally flows to a bottom of the box.

The recovery box is provided with a filter cotton carrier roller at the first filter cotton moving port, and a filter cotton supply roller is arranged at a side part of the filter cotton carrier roller at one side of the recovery box to supply the first filter cotton into the recovery box; and a filter cotton collecting roller for recovering the first filter cotton is also installed on the other side of the recovery box opposite to the filter cotton supply roller, and the filter cotton collecting roller and the filter cotton supply roller are respectively arranged on two sides of the recovery box, the first filter cotton is wound around the filter cotton supply roller and the first filter cotton enters the recovery box under the support of the filter cotton carrier roller; the filter cotton collecting roller pulls the first filter cotton in the recovery box to move, which can provide new filter cotton in time and improve the filtering efficiency and quality.

A lifting mechanism is installed in the shell, and the nozzle is connected with the lifting mechanism; and a distance between two adjacent nozzles can be adjusted.

Further, the nozzle includes a nozzle body, a through hole is arranged in the nozzle body, one side of the through hole is communicated with an air supply mechanism and the other side is communicated with a liquid supply mechanism; a flow adjusting needle is arranged in the nozzle body by passing through the through hole; one end of the through hole in the nozzle body is connected with one end of a gas-liquid cap, the other end of the gas-liquid cap is provided with a sealing cap, a mixing cavity is formed before the sealing cap and the gas-liquid cap, and the sealing cap and the gas-liquid cap are both provided with a channel which can communicate with the through hole. By setting the nozzle structure and setting the flow adjusting needle, an amount of the release agent in the spraying process can be controlled, and a utilization rate of the release agent is effectively improved.

The shell is a closed shell, and a top of the shell is an arc-shaped surface, which is convenient for the release agent to flow, a setting height of the opening of the shell is higher than that of the nozzle, the opening is arranged along a width direction of the shell, the shell is provided with an openable shell sealing door, and the shell sealing door can be locked.

Further, a side part of the shell is provided with a carrier roller for supporting the belt mold to move below a center of the opening; and the bottom of the shell is provided with a drainage bottom plate, and one side of the drainage bottom plate is lower than the other side.

As a further technical solution, an air deflector is arranged on one side of the sucking component in the oil mist collecting mechanism, the air deflector is provided with an air port, the filter layer is arranged on the other side of the air deflector opposite to the sucking component, the filter layer includes a first filter plate and a second filter cotton which are sequentially arranged from an inlet of the oil mist collecting box to the air deflector, the second filter cotton is fixed on a filter screen shell through a filter cotton clip, and the oil mist collecting box is provided with a first oil leakage port below the filter layer.

According to the release agent spraying mechanism above, the belt mold moves through the opening under the drive of a power mechanism, and during the moving process of the belt mold, the nozzle sprays the release agent to the belt mold, which is beneficial to filling the cavity with the release agent, and release agent grains in the shell are collected by the oil mist collecting mechanism, thereby reducing air pollution, improving the working environment and improving the utilization rate of the release agent.

Furthermore, one side of the oil mist collecting box is further provided with a filter cartridge communicated with the oil mist collecting box, a bottom of the sucking component is provided with a second oil leakage port, and both the first oil leakage port and the second oil leakage port are communicated with the recovery box.

A surface of a first layer of filter orifice plate has pores that allow oil mist to pass through, and the filter plate can filter and precipitate most of the water or oil mist in the oil mist; the oil mist after primary filtration first passes through the filter screen shell, and then passes through the second filter cotton washed with water to complete secondary filtration; the oil mist and water mist after primary and secondary filtration are filtered and precipitated twice to a bottom of the oil mist collecting box, and flow to the recovery tank from the first oil leakage port; the oil mist and water mist after secondary filtration, under the action of a suction produced by an impeller that is installed on a front end of a motor which serves as the sucking component, pass through an air guide port on the air deflector and enter a right side of the box body, and finally reach the filter cartridge, which is a high-efficiency filter cartridge; after triple filtration and precipitation, the oil mist and water mist flow into the recovery box through the second oil leakage port.

The lifting mechanisms refer to two sets of guide rail slider mechanisms arranged inside the shell, sliders in the two sets of guide rail slider mechanisms are connected through a nozzle mounting plate, the guide rail is vertically secured to an inner wall of the shell, the sliders can slide relative to the guide rails, the nozzle is mounted on the nozzle mounting plate, and the nozzle mounting plate is provided with a plurality of mounting holes or long holes to realize distance adjustment between two adjacent nozzles, and the slider is provided with a star-shaped tightening handle which screws in and squeezes the guide rail with an inner wall of the slider, so that a position of the slider can be fixed, that is, a height of the nozzle can be fixed.

The present disclosure has the following beneficial effects:

(1) According to the production line of the present disclosure, six procedures such as the slurry coating, slurry scraping, drying, separation, sweeping and release agent spraying are sequentially carried out, so that a set of circulating production line is formed, and the high automation of CA abrasive grain production is realized.

(2) According to the production line of the present disclosure, the design of each working procedure is based on practical principles, and functions of each working procedure are realized by adopting a simplified and efficient mechanical structure, so that the machine manufacturing costs and debugging difficulty are reduced, and the efficiency of industrial production of abrasive grains is improved.

(3) According to the production line of the present disclosure, the transmission device employs a plurality of power sources as well as employs belt driving roller driving, synchronous belt driving and chain plate driving, so that the belt mold has sufficient power in the moving process, and the phenomena of abrasive accumulation, uneven coating and adhesion between abrasives are avoided.

(4) According to the production line of the present disclosure, a chain plate driving mechanism is arranged below coating and scraping, so that the belt mold can move stably at a constant speed under the pressure of the scraper without damaging the belt mold, and the slurry can be filled into the cavity and the excess slurry on the surface of the belt mold can be removed.

(5) According to the production line of the present disclosure, a synchronous belt transmission mechanism is arranged at a lower end of the oven, so that the heat dissipation is fast, and the belt mold is prevented from being damaged by high temperature; and the tension rolls are arranged on belt driving and driven rollers, the sweeping mechanism and the separation mechanism, which increases the stability of the belt mold during moving and improves the working efficiency of sweeping and separation.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

Figure 1:
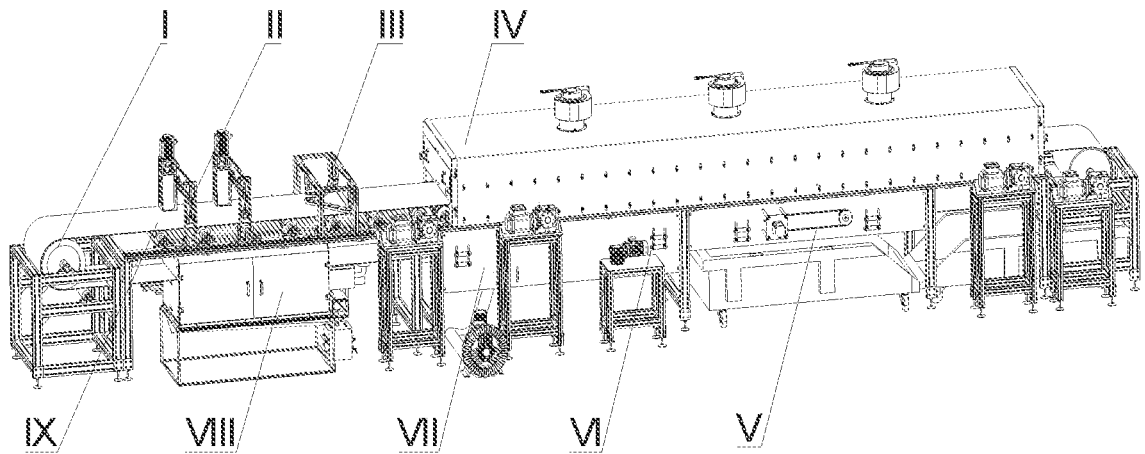
FIG. 1 shows a general assembly drawing of a production line of a CA abrasive.

wherein: I is transmission device; II is slurry coating mechanism; III is scraping mechanism; IV is oven; V is separation mechanism; VI is rolling brush cleaning mechanism; VII is air blade purging mechanism; VIII is release agent spraying mechanism; and IX is belt mold;

I-1 refers to a machine frame; I-2 refers to a chain plate supporting mechanism; I-3 refers to a synchronous belt driving mechanism; I-4 refers to a belt mold driving roller; I-1-1 refers to a belt mold driven roller; I-1-2 refers to a pillow block bearing of the belt mold driven roller; I-1-3 refers to a tension roll 1; I-1-4 refers to a pillow block bearing of the tension roll 1; I-1-5 refers to a supporting rack; I-2-1 refers to a chain plate; I-2-2 refers to a chain plate retainer ring; I-2-3 refers to a bearing of the chain plate supporting mechanism; I-2-4 refers to a chain plate connecting nut; I-2-5 refers to a chain plate connecting bolt; I-2-6 refers to a driving roller of the chain plate supporting mechanism; I-2-7 refers to a drive shaft of the chain plate supporting mechanism; I-2-8 refers to a drive motor of the chain plate supporting mechanism; I-2-9 refers to a coupler 1; I-2-10 refers to a driving roller set bolt of the chain plate supporting mechanism; I-3-1 refers to a bearing of the synchronous belt driving mechanism; I-3-2 refers to a synchronous belt; I-3-3 refers to a synchronous belt wheel; I-3-4 refers to a synchronous belt drive shaft; I-3-5 refers to a coupler 2; I-3-6 refers to a synchronous belt drive motor; I-3-7 refers to a frame of the synchronous belt drive motor; I-3-8 refers to a holding screw of the synchronous belt wheel; I-4-1 refers to a motor of the belt mold driving roller; I-4-2 refers to a belt securing plate for the motor of the belt mold driving roller; I-4-3 refers to a supporting rack for the motor of the belt mold driving roller; I-4-4 refers to a pillow block bearing of the tension roll 2; I-4-5 refers to a tension roll 2; I-4-6 refers to a pillow block bearing of the belt mold driven roller; and I-4-7 refers to a belt mold driving roller;

II-1 refers to an injector supporting rack; II-2 refers to an injector; II-2-1 refers to a injector motor; II-2-2 refers to a securing bolt of the injector motor; II-2-3 refers to an upper frame of the injector; II-2-4 refers to an injector coupler; II-2-5 refers to an upper securing ring bolt of the injector screw; II-2-6 refers to an upper securing ring of the injector screw; II-2-7 refers to an upper frame bolt; II-2-8 refers to a thrust bearing; II-2-9 refers to a thrust bearing pedestal; II-2-10 refers to a injector screw nut; II-2-11 refers to a push rod; II-2-12 refers to an injector screw; II-2-13 refers to a lower retainer ring of the injector screw nut; II-2-14 refers to a bolt; II-2-15 refers to an injector piston; II-2-16 refers to a rubber ring; II-2-17 refers to slurry; II-2-18 refers to a syringe; and II-2-19 refers to a syringe stopper;

III-1 refers to a scraping plate and suspension device; III-2 refers to a master support of the scraping device; III-2-1 refers to an outer connecting piece of the suspension device; III-2-2 refers to a bolt 1 of the outer connecting piece of the suspension device; III-2-3 refers to a bolt 2 of the outer connecting piece of the suspension device; III-2-4 refers to an inner connecting piece of the suspension device; III-2-5 refers to a damping device; III-2-6 refers to a bolt of a triangular supporting plate; III-2-7 refers to a triangular supporting plate; III-2-8 refers to a scraper;

IV-1 refers to a fastening and screwing handle; IV-2 refers to an oven port baffle; IV-3 refers to a handle of the oven port baffle; IV-4 refers to an oven port securing plate; IV-5 refers to an inner oven shell; IV-6 refers to a heat source mechanism of the oven; IV-7 refers to a protective cover; IV-8 refers to an outer oven shell; and IV-9 refers to an exhaust mechanism;

V-1 refers to a separation tension roll bearing; V-2 refers to a separation tension roll; V-3 refers to a camshaft pillow block bearing; V-4 refers to a cam; V-5 refers to a camshaft; V-6 refers to a positioning plate of the cam separation mechanism; V-7 refers to a flat pulley; V-8 refers to a flat pulley axial baffle; V-9 refers to a flat pulley holding screw; V-10 refers to a flat belt; V-11 refers to a holding screw of the separation motor securing plate; V-12 refers to a separation motor securing plate; V-13 refers to a separation motor; V-14 refers to a supporting column of the separation motor; V-15 refers to a separation tension roll stator; and V-16 refers to a separation tension roll securing bolt;

VI-1 refers to a rolling brush pillow block bearing; VI-2 refers to a rolling brush; VI-3 refers to a rolling brush pillow block bearing; VI-4 refers to a rolling brush motor; and VI-5 refers to a supporting rack of the rolling brush motor;

VII-1 refers to a tensioning component; VII-2 refers to a mechanism positioning plate; VII-3 refers to an air blade angle adjusting screw; VII-4 refers to an air blower; VII-5 refers to an air blower pipeline; VII-6 refers to an air blade securing screw; VII-6-1 refers to an air blade securing screw; VII-6-2 refers to an air blade securing screw nut 1; VII-6-3 refers to an air blade securing screw nut 2; VII-7 refers to an air blade; VII-7-1 refers to an air blade air-volume adjusting plate; VII-7-2 refers to a screw of the air blade air-volume adjusting plate; VII-7-3 refers to an air blade cavity; VII-7-4 refers to baffles on two sides of the air blade;

VIII-1 refers to a spraying mechanism; VIII-1-1 refers to a side plate of the shell; VIII refers to a shell; VIII-2-1 refers to a nozzle lifting mechanism; VIII-2-2 refers to a nozzle supporting plate; VIII-2-3 refers to a nozzle; VIII-2-4 refers to a tightening handle; VIII-3 refers to an oil mist collecting mechanism; VIII-3-1 refers to an oil mist collecting box; VIII-3-2 refers to a porous filter plate, VIII-3-3 refers to a filter cotton set; VIII-3-4 refers to an impeller; VIII-3-5 refers to a motor; VIII-3-6 refers to a high-efficiency filter cartridge; VIII-4 refers to a recovery mechanism; VIII-4-1 refers to a recovery box cover; VIII-4-2 refers to a concave filter screen; VIII-4-3 refers to a filter cotton; VIII-4-4 refers to a recovery box body; VIII-4-5 refers to a filter cotton carrier roller; VIII-4-6 refers to a filter cotton supply roller; and IX refers to a belt mold; and IX-1 refers to a cavity.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof.

For ease of description, words "up", "down", "left", and "right" appearing in the present disclosure only mean that they are consistent with the up, down, left, and right directions of the drawings themselves, and do not limit the structure. It is for the convenience of describing the present disclosure and simplifying the description, rather than indicating or implying that the device or element referred to must have a specific orientation, be constructed and operated in a specific orientation, and therefore cannot be understood as a limitation of the present disclosure.

As introduced in the background art, there are shortcomings in the prior art. In order to solve the above technical problems, this application proposes a production line of a CA abrasive.

Embodiment 1

The production line disclosed in this embodiment will be further explained with reference to FIG. 1 to FIG. 32 hereinafter.

As shown in FIG. 1, the production line of the CA abrasive includes a transmission device I, a slurry coating mechanism II, a scraping mechanism III, an oven IV, a separation mechanism V, a rolling brush cleaning mechanism VI, an air blade purging mechanism VII, a release agent coating mechanism VIII, and a belt mold IX.

Figure 2:
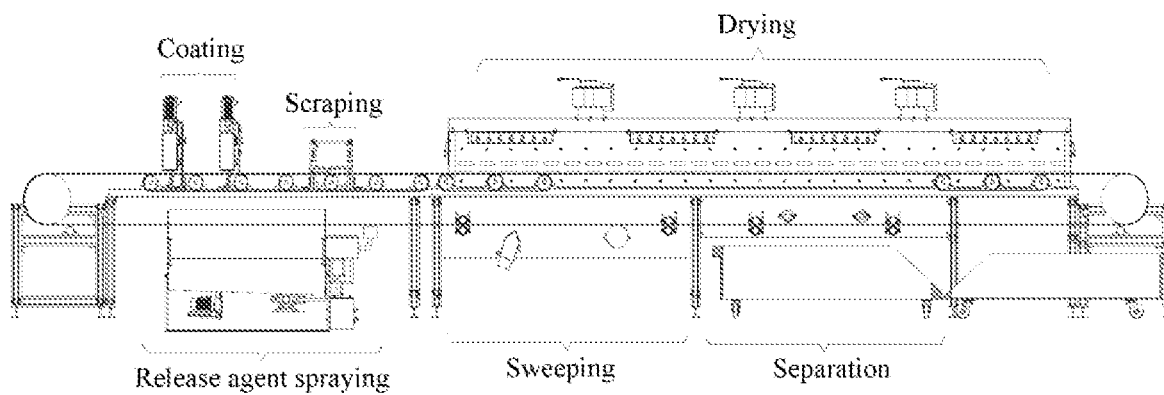
FIG. 2 shows a flow chart of the production line of the CA abrasive.

As shown in FIG. 2, a production process of a single working cycle includes six parts: slurry coating, slurry scraping, slurry drying, separation, belt mold sweeping and release agent spraying. Each part puts forward different requirements for the transmission device.

Figure 3:
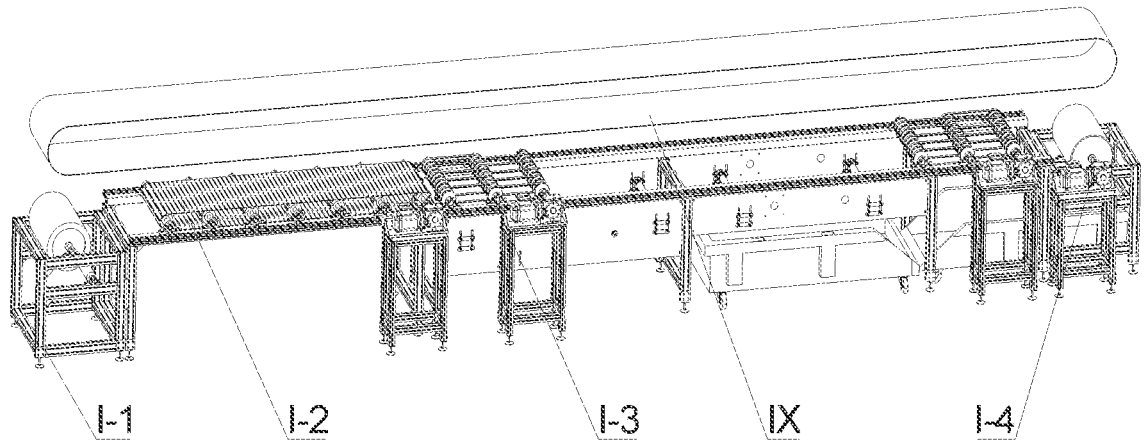
FIG. 3 shows an exploded view of a transmission device of the production line of the CA abrasive.
Figure 4:
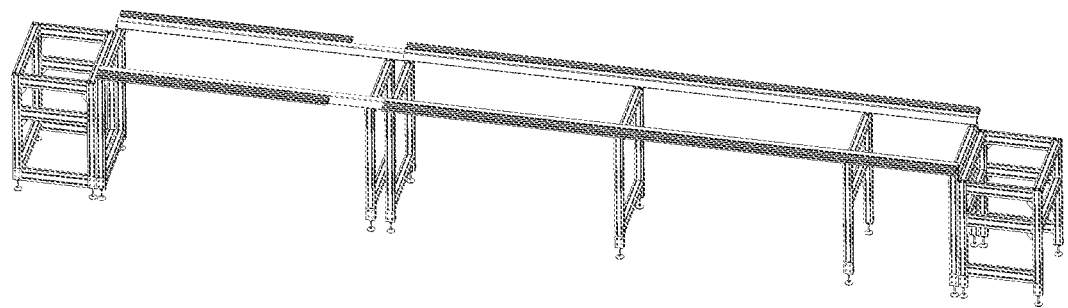
FIG. 4 shows an axial side view of a supporting rack of the transmission device of the production line of the CA abrasive.

As shown in FIG. 3 and FIG. 4, a main function of the transmission device is to convey the belt mold, and a structure thereof mainly includes a machine frame I-1, a chain plate supporting mechanism I-2, a synchronous belt driving mechanism I-3, and a belt mold driving roller I-4. The annular belt mold IX is sleeved on the driving and driven rollers at two ends of the transmission device, the belt mold above the transmission device is supported by the chain plate supporting mechanism I-2 and the synchronous belt driving mechanism I-3, and the belt mold below the transmission device is tensioned by a plurality of tension rolls.

Figure 5:
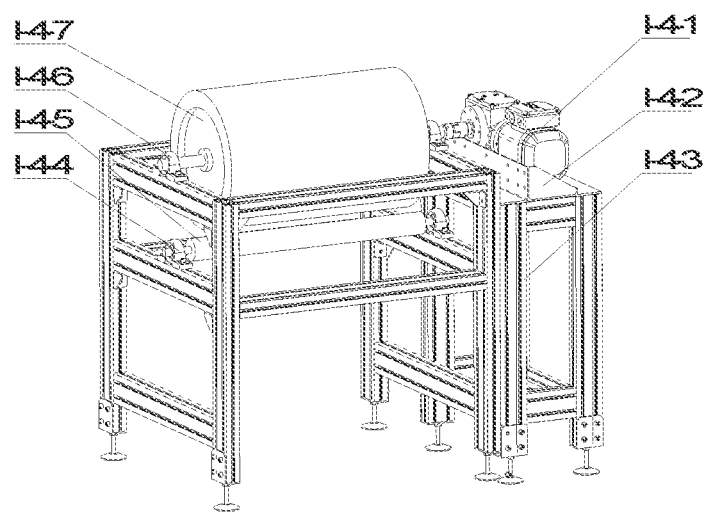
FIG. 5 shows driving roller of a belt mold of the production line of the CA abrasive.
Figure 6:
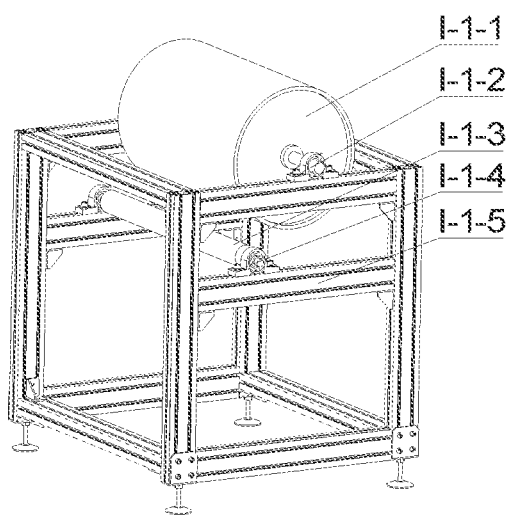
FIG. 6 shows a driven roller of a belt mold of the production line of the CA abrasive.

As shown in a belt mold driving roller set in FIG. 5 and a belt mold driven roller set in FIG. 6, a belt mold driving roller I-4-7 is driven by a motor I-4-1 of the belt mold driving roller via a coupler, and a speed reducer may be added according to a moving speed of the belt mold. An axle of the belt mold driving roller I-4-7 is fixed on a supporting rack through a pillow block bearing I-4-6 of the belt mold driven roller, and the motor I-4-1 of the belt mold driving roller is secured to a securing plate I-4-2 for the motor of the belt mold driving roller, and the securing plate I-4-2 for the motor of the belt mold driving roller is secured to a supporting rack I-4-3 for the motor of the belt mold driving roller. The belt mold driven roller I-1-1 is secured to the supporting rack I-1-5 through a pillow block bearing I-1-2 of the belt mold driven roller. The driving and driven rollers belong to the prior art.

A tension roll 2 I-4-5 is arranged below the belt mold driving roller I-4-7, and two ends of the tension roll 2 I-4-5 are secured to the supporting rack through a pillow block bearing I-4-4 of the tension roll 2. A tension roll 1 I-1-3 is arranged below a belt mold driven roller I-1-1, and two ends of the tension roll 1 I-1-3 are secured to the supporting rack I-1-5 through a pillow block bearing I-1-4 of the tension roll 1. The tension roll 2 I-4-5 and the tension roll 1 I-1-3 are matched below the belt mold. The tension roll can increase a wrap angle of the belt mold attached to the roller, and increase a friction force and stability.

Figure 14:
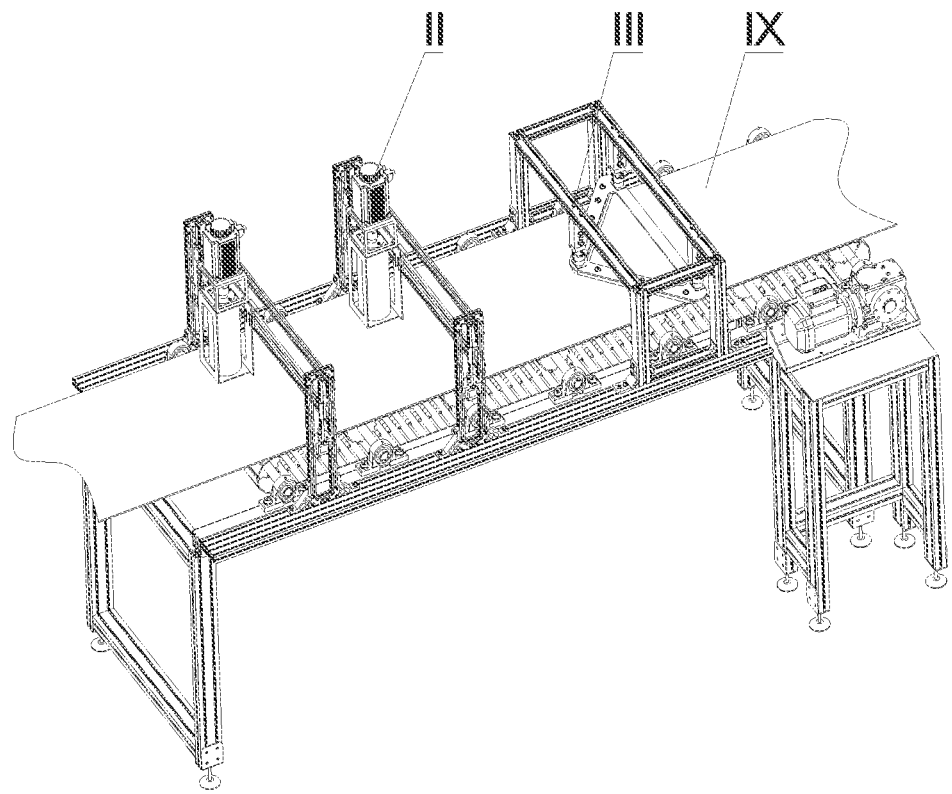
FIG. 14 shows a general assembly drawing of slurry coating and scraping.
Figure 15:
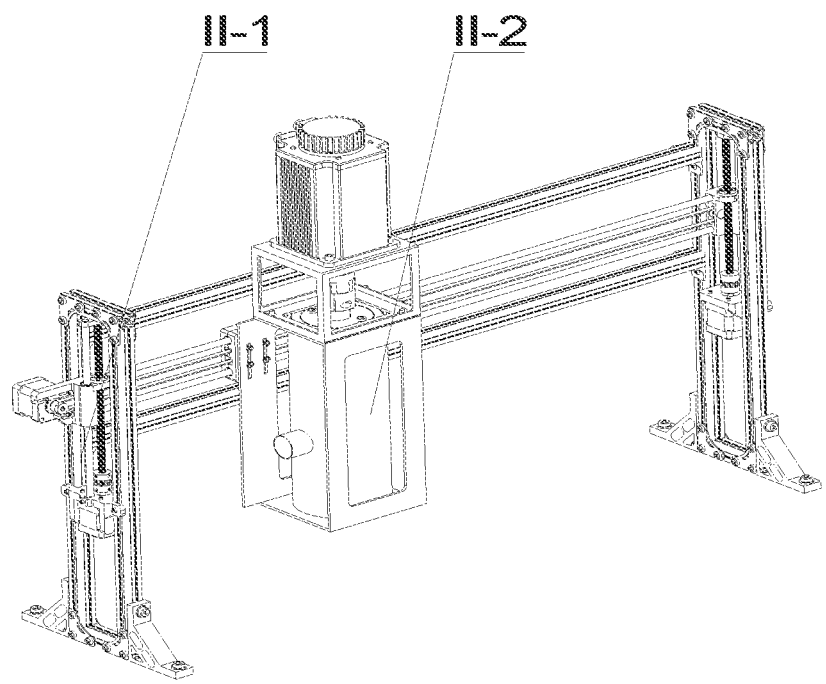
FIG. 15 shows an axial side view of an injector coating mechanism.
Figure 16:
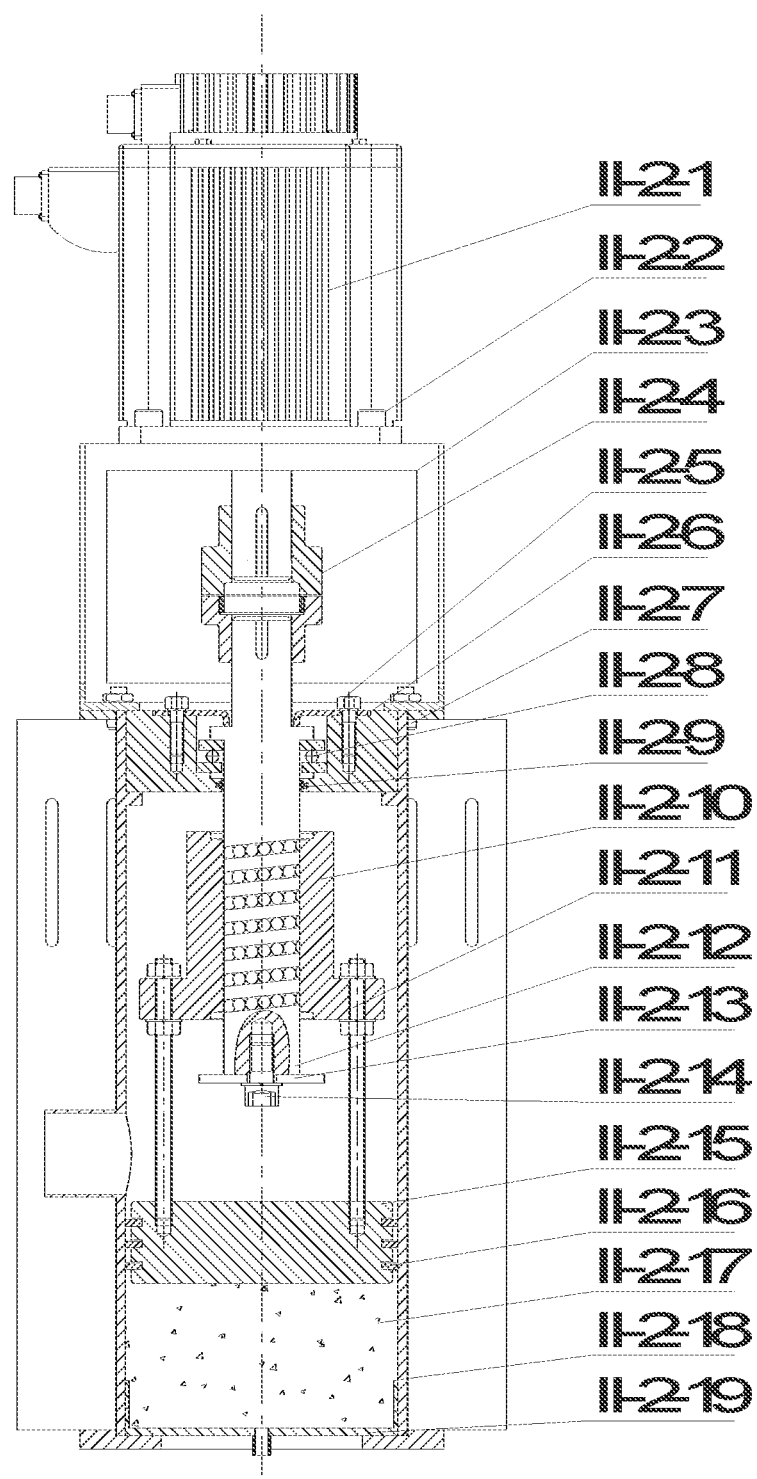
FIG. 16 shows a full sectional view of an injector.

As shown in FIG. 14 to FIG. 16, the slurry coating mechanism is composed of an injector supporting rack II-1 and an injector II-2, wherein the injector supporting rack uses a transverse screw guide rail and a vertical screw guide rail to realize left-right and up-down movement of the injector. An injector motor II-2-1 is secured on an injector upper frame II-2-3 by a securing bolt II-2-2 of the injector motor. An upper frame II-2-3 of the injector is connected with a lower frame of the injector by an upper frame bolt II-2-7, and an axial end of the injector motor II-2-1 is connected with an injector screw II-2-12 by an injector coupler II-2-4. A shoulder of the injector screw II-2-12 is secured by a thrust bearing II-2-8. A lower end of the thrust bearing II-2-8 is positioned by a thrust bearing seat II-2-9, and an upper part of the thrust bearing II-2-8 is secured by the upper frame bolt II-2-7. The upper frame bolt II-2-7 is secured on the thrust bearing seat II-2-9 by an upper securing ring bolt II-2-5 of the injector screw and an upper securing ring II-2-6 of the injector screw. A lower end of the thrust bearing seat II-2-9 is positioned by a boss in a syringe II-2-18, and an upper end of the thrust bearing seat II-2-9 is secured by the upper frame II-2-3 of the injector. An injector screw nut II-2-12 is installed on the injector screw II-2-12, and a thrust bearing sealing ring is installed in the thrust bearing seat II-2-9. Four push rods II-2-11 are installed on the injector screw nut II-2-10, and lower ends of the push rods II-2-11 are secured on an injector piston II-2-15. The injector screw nut moves to drive the push rods and the injector piston to move. A lower retainer ring II-2-13 of the injector screw nut is secured on a lower end of the injector screw II-2-12 by a bolt II-2-14, and a rubber ring II-2-16 is sleeved in a ring slot of the injector piston II-2-15. The rubber ring can ensure the tightness when extruding the slurry, and prevent the slurry from entering above the injector piston. A syringe stopper II-2-19 is connected with the syringe stopper II-2-18 by threads, and a lower end of the syringe stopper II-2-19 is positioned by a boss at a bottom of the lower framework of the injector. When the injector piston extrudes slurry, the slurry II-2-17 will be extruded from an opening of the syringe stopper and coated on the belt mold in the form of layered slurry.

Figure 17:
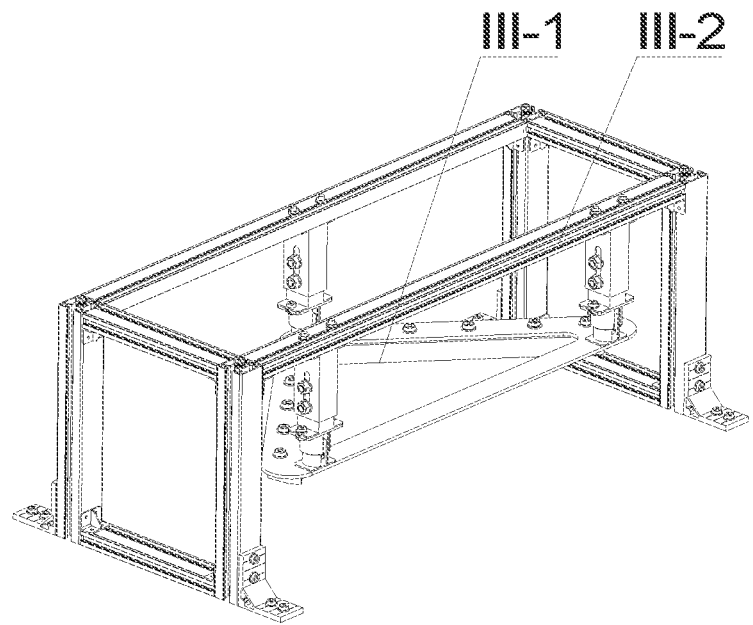
FIG. 17 shows an axial side view of a scraping mechanism.
Figure 18:
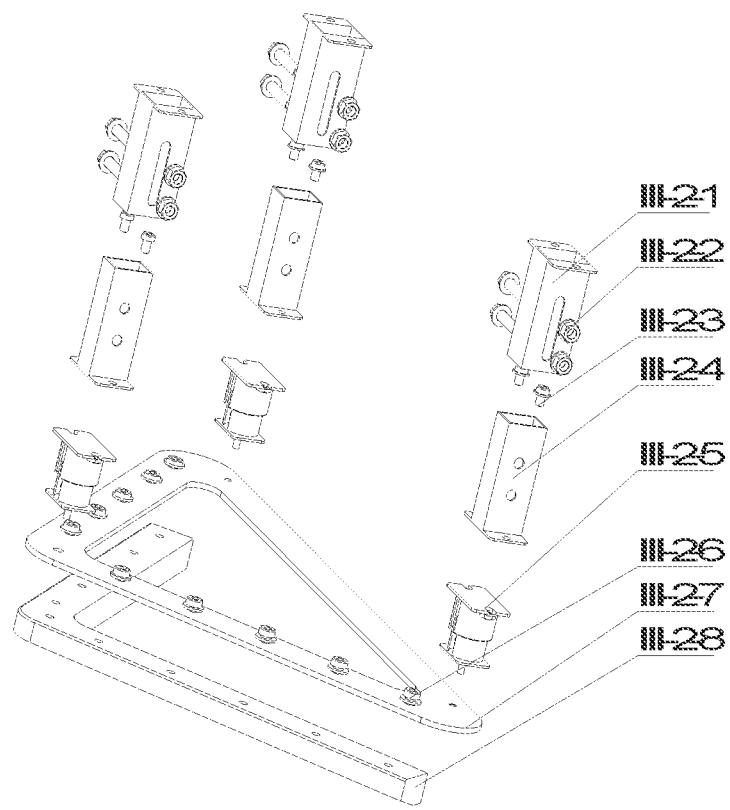
FIG. 18 shows an exploded view of a scraping plate and a suspension mechanism.

As shown in FIG. 17 and FIG. 18, the slurry scraping mechanism includes a master support III-2 of a scraping device, a scraping plate and a suspension device III-1. An outer connecting piece III-2-1 of the suspension device is secured on the master support III-2 of the scraping device by a bolt, and an inner connecting piece III-2-4 of the suspension device is connected with the outer connecting piece III-2-1 of the suspension device by a bolt 1 III-2-2 of the outer connecting piece of the suspension device, so as to adjust a tightness of the bolt 1 of the outer connecting piece of the suspension device, and then adjust relative positions of the two connecting pieces, i.e., the total length of the two connecting pieces. A lower end of the inner connecting piece III-2-4 of the suspension device is connected with a damping device III-2-5 through a bolt 2 III-2-3 of the outer connecting piece of the suspension device, and a triangular supporting plate III-2-7 is fixedly connected with a scraper III-2-8 through a bolt III-2-6 of the triangular supporting plate. When the scraper III-2-8 fills a slurry layer into the cavity of the belt mold, the damping device can automatically adjust a longitudinal force applied on the scraper. The belt mold IX moves to the right at a stepping speed V, the cavity of the belt mold has been sprayed with the release agent, and a coated slurry layer is in front of the scraper III-2-8. An inclined surface of the scraper squeezes the slurry into the cavity of the belt mold, and a bottom plane of the scraper flattens and compacts the slurry.

Figure 7:
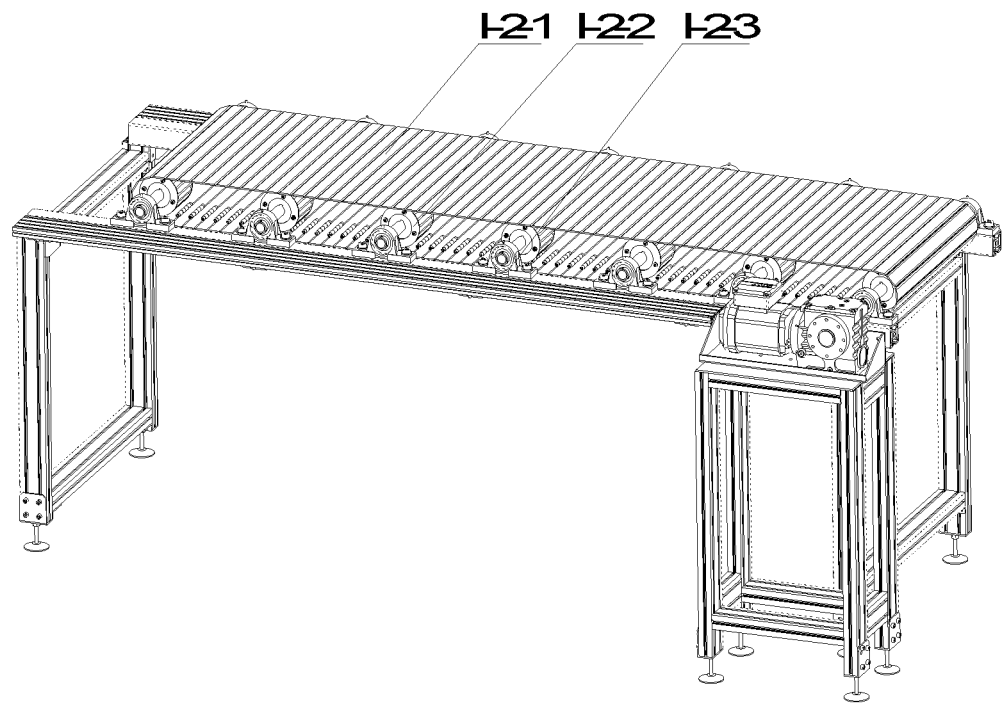
FIG. 7 shows an axial side view of a chain plate supporting mechanism.

As shown in FIG. 7, because the slurry coating mechanism and the scraping mechanism require the belt in a working area to be flat and not shake with the movement of the belt mold, a chain plate supporting mechanism I-2 is designed in the present disclosure.

Figure 8:
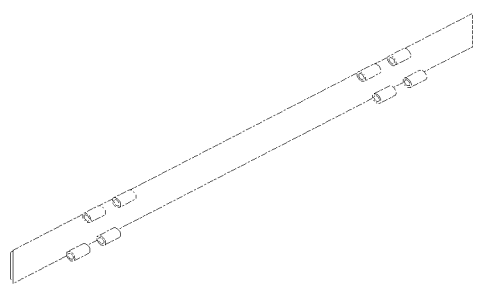
FIG. 8 shows an axial side view of a chain plate.
Figure 9:
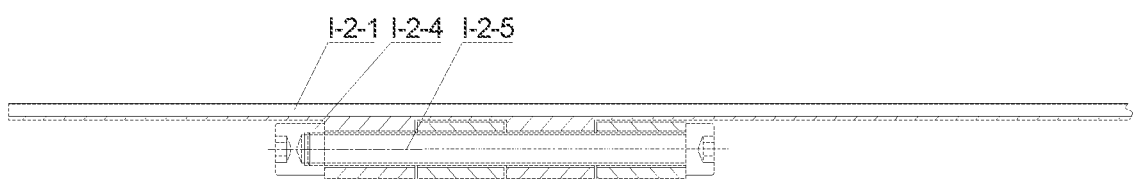
FIG. 9 shows a sectional view showing a connection between adjacent chain plates.
Figure 10:
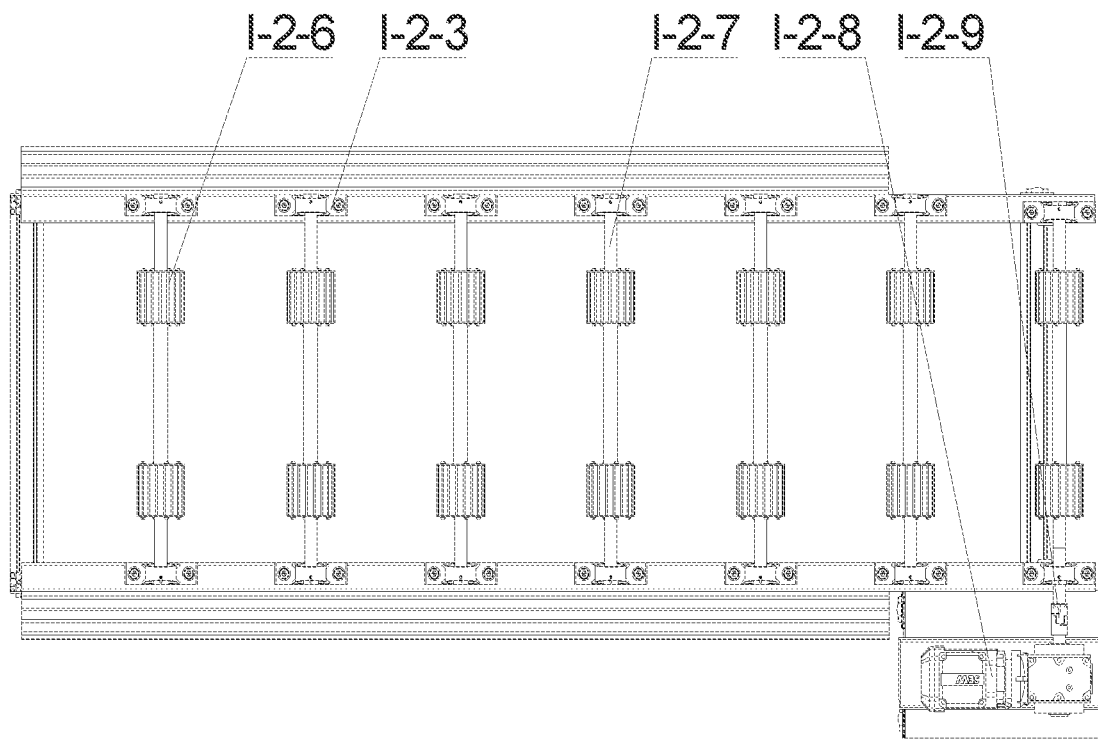
FIG. 10 shows a driving mechanism of the chain plate supporting mechanism.
Figure 11:
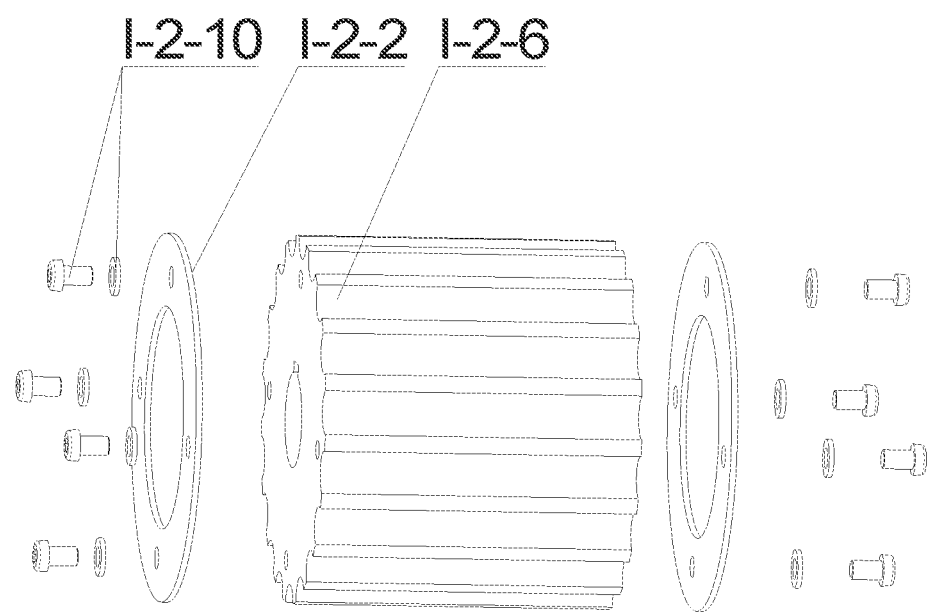
FIG. 11 shows an exploded view of a driving roller set of the chain plate supporting mechanism.
Figure 12:
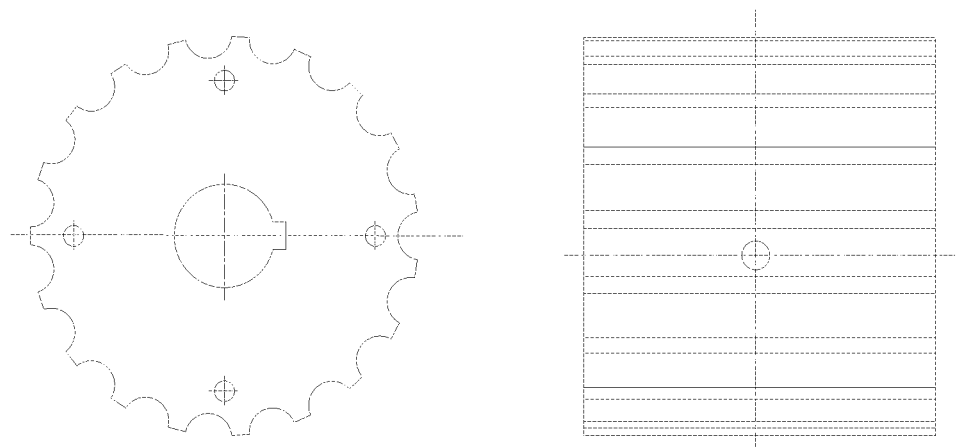
FIG. 12 shows a front view and a side view of the driving roller of the chain plate supporting mechanism.
Figure 13:
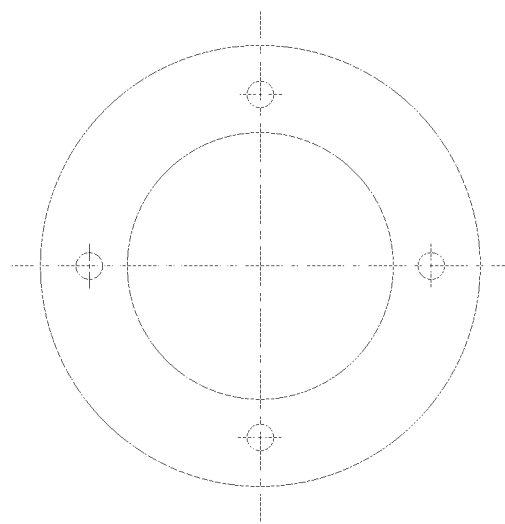
FIG. 13 shows a chain plate retainer ring.

As shown in FIG. 8 and FIG. 9, a connecting hole is machined under a chain plate I-2-1, and adjacent chain plates I-2-1 may be connected by a chain plate connecting nut I-2-4 and a chain plate connecting bolt I-2-5, and a plurality of chain plates are connected side by side in turn to form a closed annular structure, which is sleeved on a surface of a driving roller I-2-6 of the chain plate supporting mechanism.

As shown in FIG. 10 to FIG. 13, connecting pieces at bottoms of the adjacent chain plates may be embedded into grooves on a surface of the driving roller I-2-6 of the chain plate supporting mechanism, the driving roller of the chain plate supporting mechanism is secured to a drive shaft I-2-7 of the chain plate supporting mechanism through key connection and holding screw connection, and a drive motor I-2-8 of the chain plate supporting mechanism transmits power to the driving roller through a coupler 1 I-2-9, thus driving the chain plate to rotate. A chain plate retainer ring I-2-2 is secured on two sides of the driving roller of the chain plate supporting mechanism through a driving roller set bolt I-2-10 of the chain plate supporting mechanism to limit movement of connecting holes at the bottoms of the adjacent chain plates and prevents the chain plates from deviating during the movement. Wales may be machined on a surface of the chain plate to increase a friction force in the process of coating and scraping, so as to ensure the normal operation of the scraping process.

Figure 21:
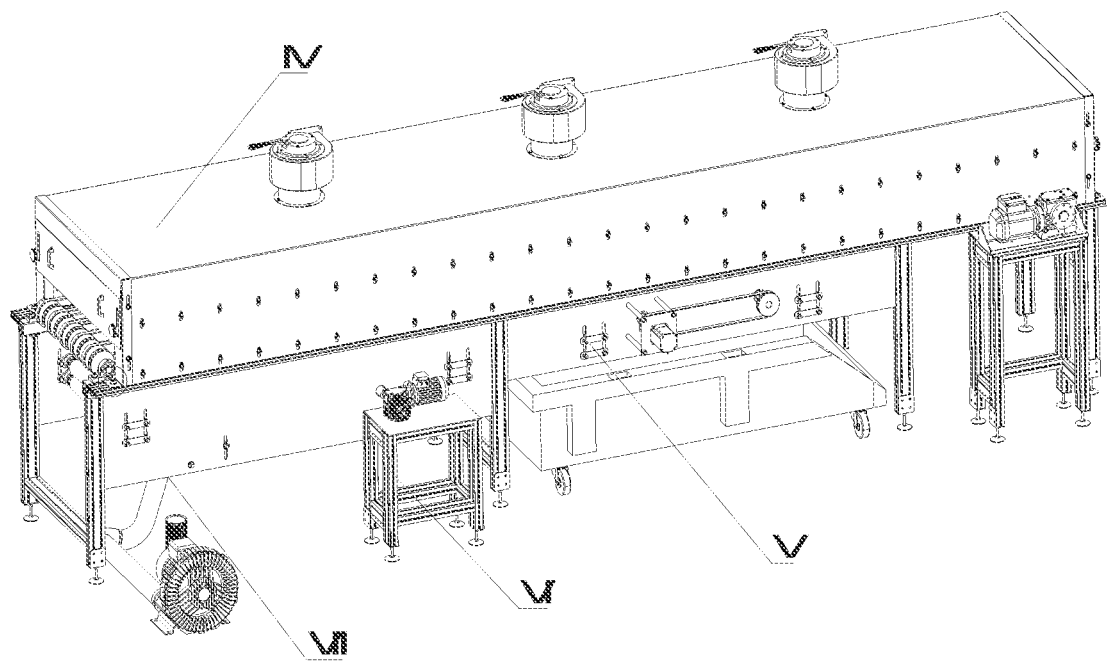
FIG. 21 shows an axial side view of an oven.
Figure 22:
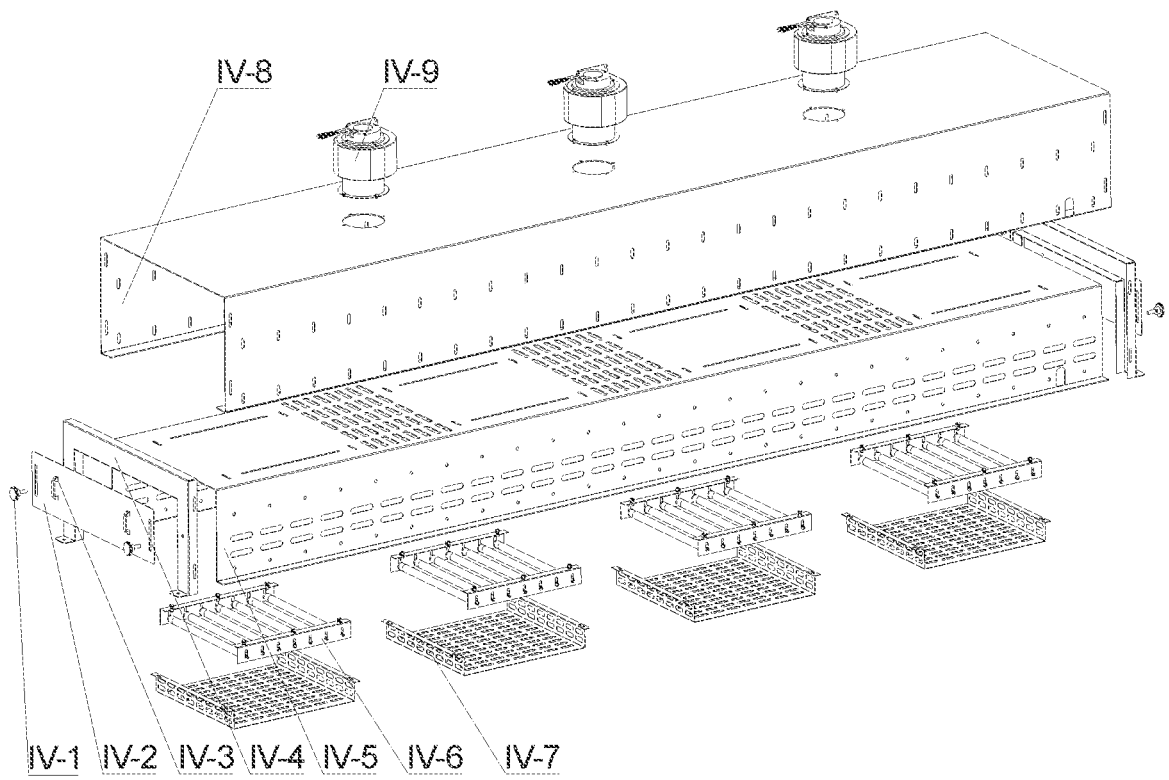
FIG. 22 shows an exploded view of the oven.

As shown in FIG. 21 and FIG. 22, the drying mechanism includes an oven, and the slurry, after being filled into the cavity, needs to be dried by the oven. The oven includes an exhaust mechanism IV-9, an outer oven shell IV-8, an inner oven shell IV-5, a heat source mechanism IV-6 of the oven and a protective cover IV-7 from top to bottom.

The exhaust mechanism IV-9 is installed above the oven, which can exhaust a volatile liquid in the oven and guide the air flow in the oven. The oven includes the outer oven shell IV-8 and the inner oven shell IV-5, and two ends of the outer oven shell IV-8 are connected with an oven port securing plate IV-4 by bolts. An oven port baffle IV-2 is connected with the oven port securing plate IV-4 through a fastening and screwing handle IV-1, and a handle IV-3 of the oven port baffle is arranged on the oven port baffle IV-2.

Under the action of the exhaust mechanism IV-9 at the top of the outer oven shell, the air outside the oven enters the oven through the oven port or a gap between the two sides of the belt and the oven, wherein the oven port baffle IV-2 can adjust a size of the air inlet and control an air flow rate entering the oven. The air entering the oven enters the cavity formed by the outer oven shell IV-8 and the inner oven shell IV-5 through a ventilation hole of the inner oven shell IV-5, and then exits the oven through a centrifugal fan.

The heat source mechanism IV-6 of the oven is secured on a top of the inner oven shell and distributed on the top of the inner oven shell according to the actual required temperature. The protective cover IV-7 is added at a lower end of the heat source mechanism IV-6 of the oven to prevent a volatile solvent from damaging lamps when flowing out of the oven with the air.

The exhaust mechanism IV-9 is set as a centrifugal fan. A plurality of sets of the heat source mechanisms IV-6 of the oven are provided, each set is provided with a plurality of lamps, and two adjacent sets of heat source mechanisms are arranged at a set distance, so a distance between two adjacent heat source mechanisms can be adjusted according to the actual situation, and a number of lamps in each set can be adjusted.

The two shells increase a heat preservation performance of the oven, and a surface of the inner oven shell is provided with a ventilation hole, which may guide the air flow in the oven. The heat source mechanism IV-6 of the oven provides heat source for the drying process. The heat source mechanism is composed of a heating lamp and a lamp holder. The protective cover IV-7 is installed below the heat source mechanism to prevent volatile substances from contact with the heat source mechanism and damage to the heating lamp. The oven port baffle IV-2 is connected with the oven port securing plate IV-4 by the fastening and screwing handle IV-1. By adjusting a distance between the oven port baffle and the belt mold, that is, adjusting the size of the air inlet of the oven, the air in the oven can also enter through the gap between the belt mold and two sides of the oven.

Under the action of the exhaust mechanism IV-9, outside air enters the oven from two sides of the belt mold and the oven port. Volatile substances of the heated CA slurry volatilize from the cavity, and under the action of air flow, the heated CA slurry enters semi-closed space through the ventilation holes at two sides of the inner oven shell and the ventilation holes at the top of the inner oven shell, and is discharged from the oven.

Figure 19:
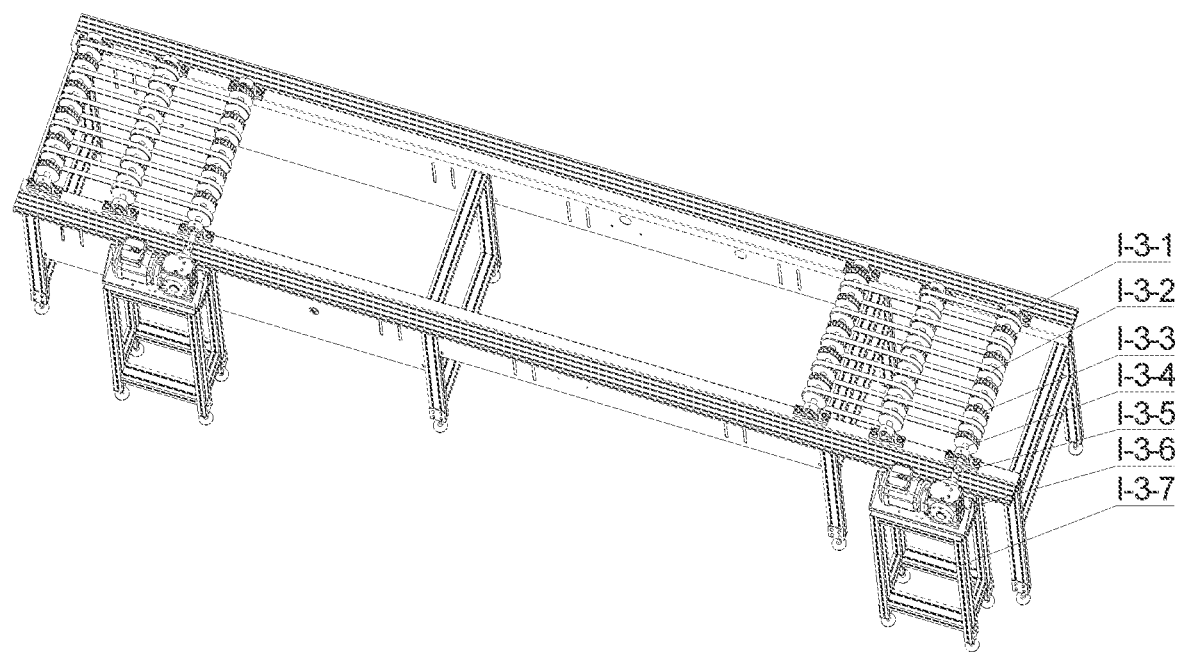
FIG. 19 shows an axial side view of a synchronous belt driving mechanism.
Figure 20:
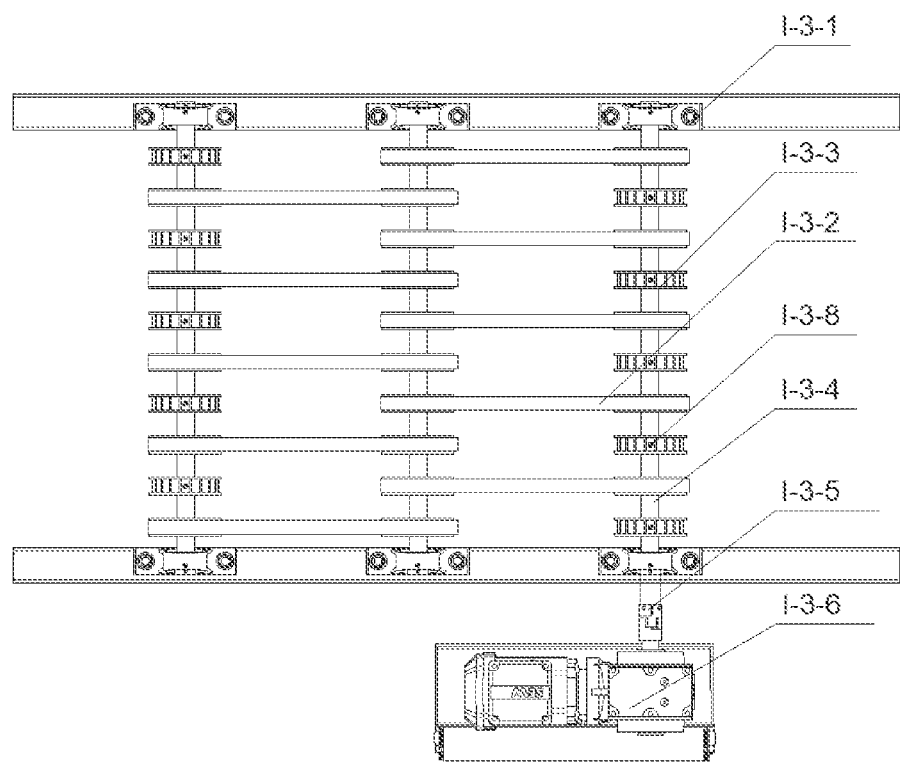
FIG. 20 shows a top view of a synchronous belt driving set.

As shown in FIG. 19 and FIG. 20, because the belt mold is relatively long, in order to improve the stability of the belt mold when moving, a synchronous belt driving mechanism is added. A power of the synchronous belt driving mechanism is transmitted from a synchronous belt drive motor I-3-6 to a synchronous belt drive shaft I-3-4 by a coupler 2 I-3-5. A synchronous belt wheel I-3-3 is secured on the synchronous belt drive shaft through a holding screw I-3-8 of the synchronous belt wheel. Two ends of the synchronous belt drive shaft I-3-4 are secured to a frame through a bearing I-3-1 of the synchronous belt driving mechanism, and the synchronous belt drive motor I-3-6 is secured to a frame I-3-7 of the synchronous belt drive motor.

One set of synchronous belt driving mechanisms is arranged corresponding to a rear side of the chain plate supporting mechanism, and one set of synchronous belt driving mechanisms is arranged corresponding to a tail end of the belt mold. The synchronous belt driving mechanism includes a plurality of rows of connected synchronous belt mechanisms, each synchronous belt mechanism is provided with a plurality of synchronous belts in parallel, the power of the adjacent synchronous belt mechanisms is transferred in sequence, the synchronous belts I-3-2 of the adjacent synchronous belt mechanisms are distributed crosswise as shown in the figure, and the synchronous belts are arranged in parallel with the surface of the belt mold. Numbers of the synchronous belt wheels and the synchronous belts can be increased according to the actual situation. Two sets of synchronous belt driving mechanisms are respectively arranged at two ends.

Figure 23:
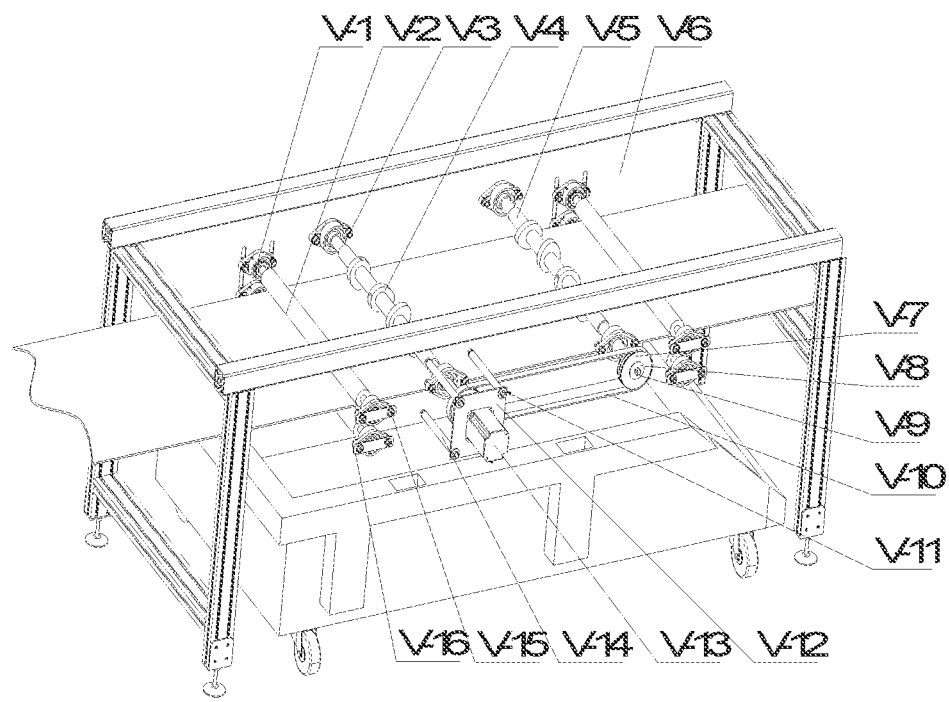
FIG. 23 shows an axial side view of a cam separation mechanism.

As shown in FIG. 23, the cam separation mechanism is secured on a positioning plate V-6 of the cam separation mechanism, and the belt mold IX is supported and tensioned by a separation tension roll V-2. A camshaft V-5 is secured by the separation tension roll V-2. The camshaft V-5 is secured to the positioning plate V-6 of the cam separation mechanism through a camshaft pillow block bearing V-3, and the separation tension roll V-2 is secured by a separation tension roll bearing V-1, which is used for adjusting a tension of the belt mold and facilitating the separation of the belt mold. A separation tension roll stator V-15 and the separation tension roll bearing V-1 are positioned on a positioning plate of the cam separation mechanism through a separation tension roll securing bolt V-16. The separation mechanism is provided with two camshafts, the power of which is provided by a separation motor V-13. The separation motor V-13 is secured on the positioning plate of the cam separation mechanism through a separation motor securing plate V-12, a holding screw V-11 of the separation motor securing plate and a supporting column V-14 of the separation motor in sequence. A flat belt V-10 transmits a power of the motor to the camshaft V-5. A flat pulley V-7 is secured by a flat pulley axial baffle V-8 and a flat pulley holding screw V-9. The two camshafts should be located close to the separation tension roll V-2 to prevent the belt from shaking and increase the stability of the separation process. A cam V-4 is secured on the camshaft V-5 by a holding screw. A number of cams and a distribution angle of the cams on the camshaft are determined according to the actual required striking frequency.

Figure 24:
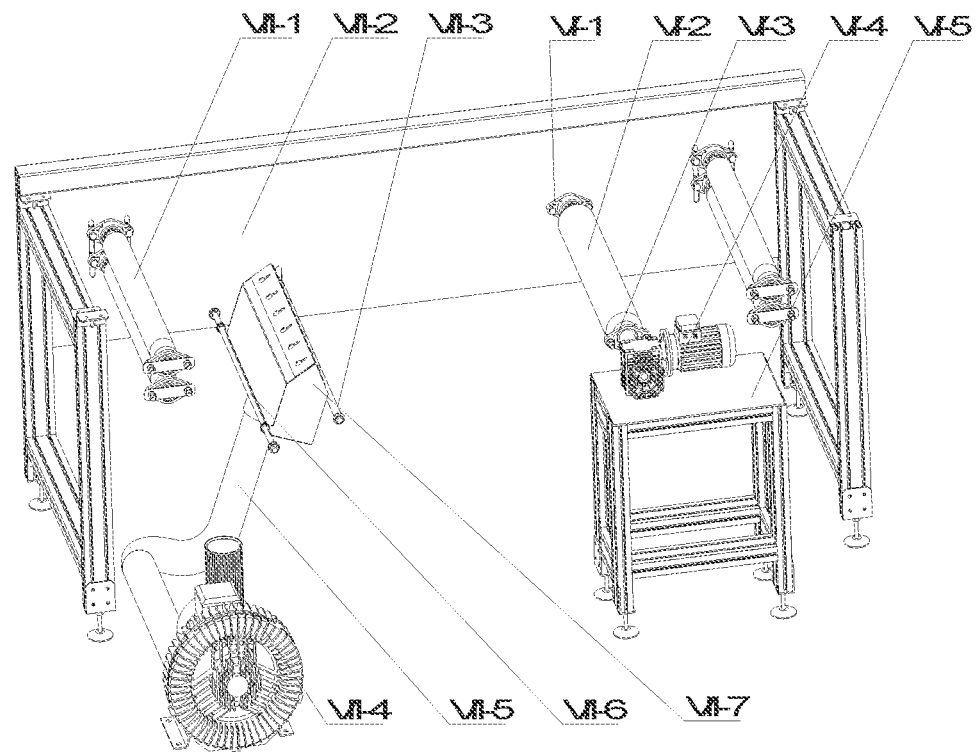
FIG. 24 shows an axial side view of a sweeping mechanism.
Figure 25:
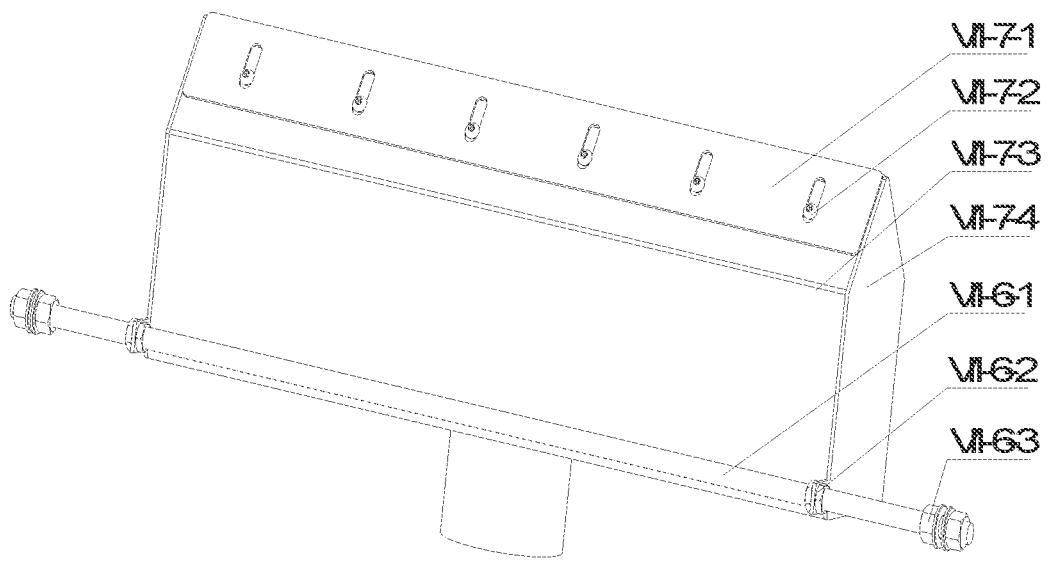
FIG. 25 shows an axial side view of an air blade.

As shown in FIG. 24 and FIG. 25, the sweeping mechanism consists of air blade sweeping, rolling brush sweeping, and tensioning mechanism. A rotating direction of the rolling brush is opposite to a moving direction of the belt (hidden in the figures). The rolling brush is set close to the separation mechanism relative to the air blade. A rolling brush VI-2 is secured on a sweeping mechanism positioning plate VII-2 through a rolling brush pillow block bearing VI-3 and a rolling brush pillow block bearing VI-1, and is powered by a rolling brush motor VI-4. The rolling brush motor VI-4 is secured on a supporting rack VI-5 of the rolling brush motor. The rolling brush can remove residual abrasive grain fragments on the surface of the belt mold, and the abrasive grain fragments on the surface and in the cavity of the belt mold can be purged by the air blade.

The air blade VII-7 is secured on an air blade securing screw VII-6 through an air blade securing screw nut 1 VII-6-2. An air blade securing screw VII-6-1 is positioned on a sweeping mechanism positioning plate VII-2 through an air blade securing screw nut 2 VII-6-3. An air blade angle adjusting screw VII-3 is not directly connected with the air blade VII-7 and is in a floating state. A purging angle of the air blade can be adjusted by adjusting a height of the air blade angle adjusting screw VII-3. The air blade consists of an air blade air-volume adjusting plates VII-7-1, a screw VII-7-2 of the air blade air-volume adjusting plate, an air blade cavity VII-7-3 and baffles VII-7-4 on two sides of the air blade. A top of the air blade cavity is provided with an air outlet, wherein the baffles VII-7-4 on the two sides of the air blade are welded on two sides of the air blade cavity VII-7-3, and the air blade air-volume adjusting plates VII-7-1 is secured on the air blade cavity VII-7-3 through the screw VII-7-2 of the air blade air-volume adjusting plate. An air outlet at a top of the air blade blows air toward the surface of the belt mold provided with the cavity, and the air blade air-volume adjusting plates is provided with a plurality of long holes. A position of the air blade air-volume adjusting plates VII-7-1 can be adjusted to control a thickness and an intensity of an air curtain of the air blade. An air blower VII-4 supplies air volume to the air blade through an air blower pipeline VII-5. The sweeping mechanism positioning plate VII-2 is further provided with a tensioning component VII-1 to tension the belt mold.

Figure 26:
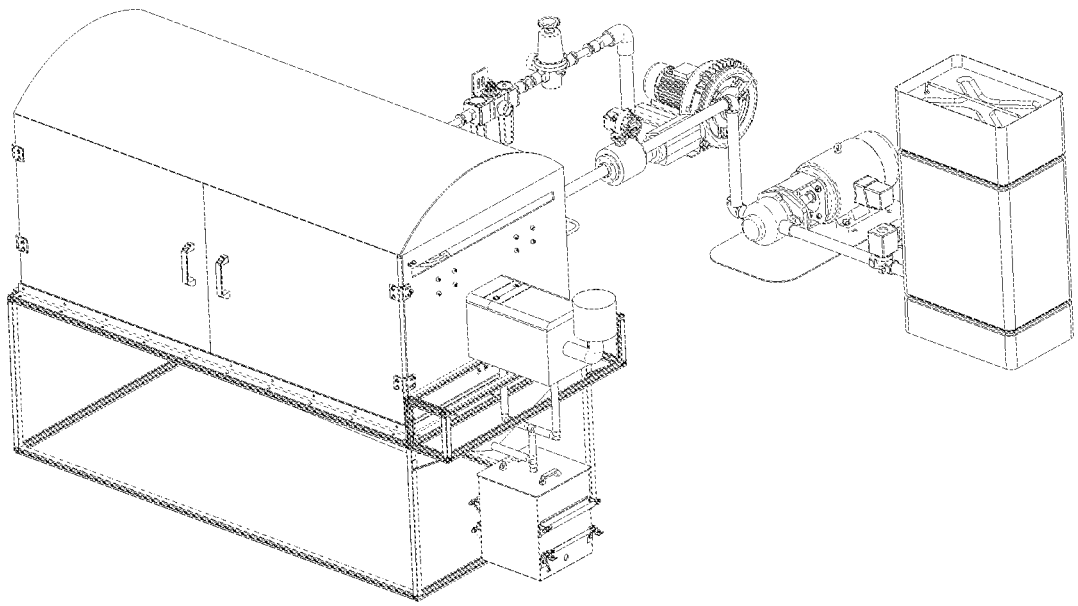
FIG. 26 shows a general assembly drawing of a release agent spraying mechanism.
Figure 27:
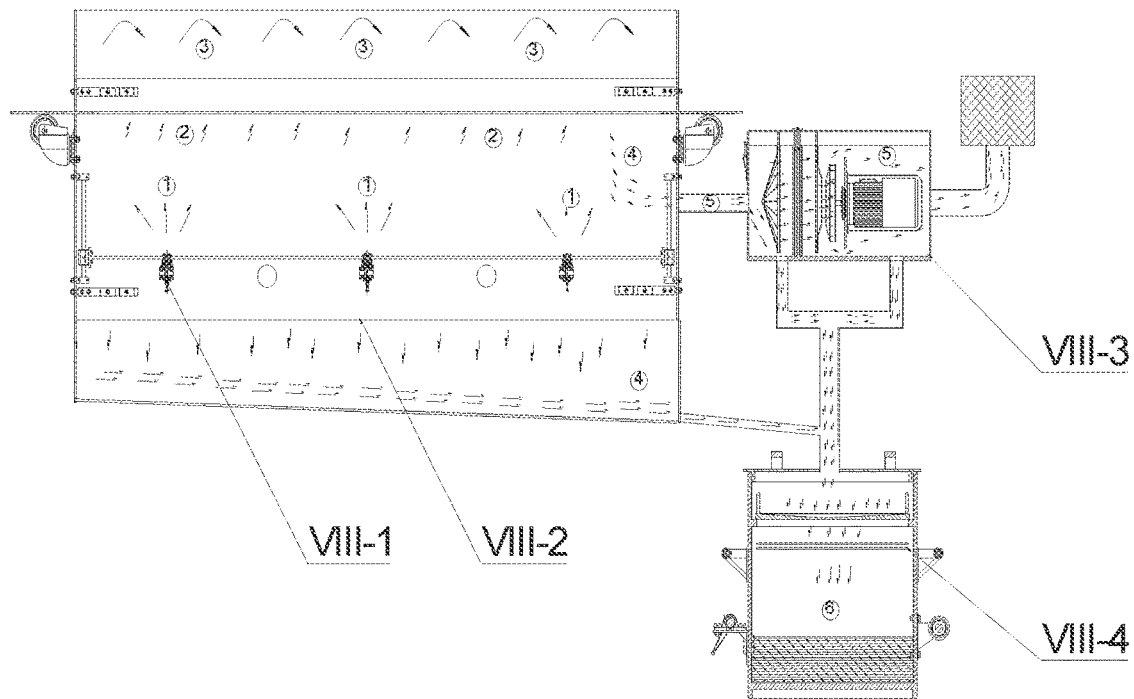
FIG. 27 shows a working flow chart of the release agent spraying mechanism.
Figure 28:
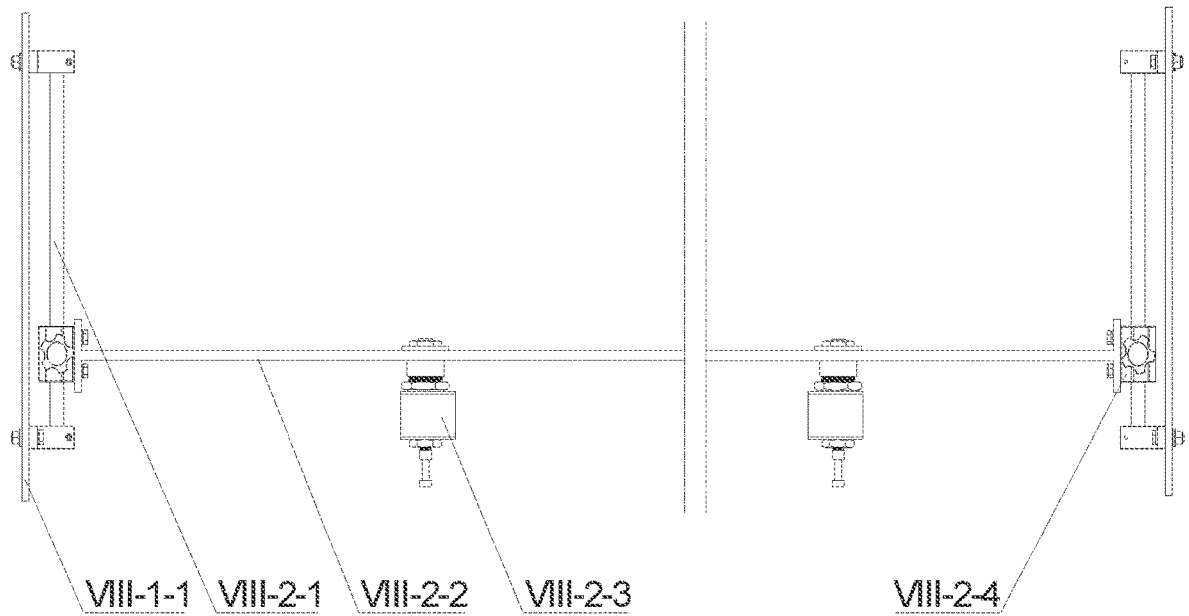
FIG. 28 shows a front view of a spraying mechanism.
Figure 29:
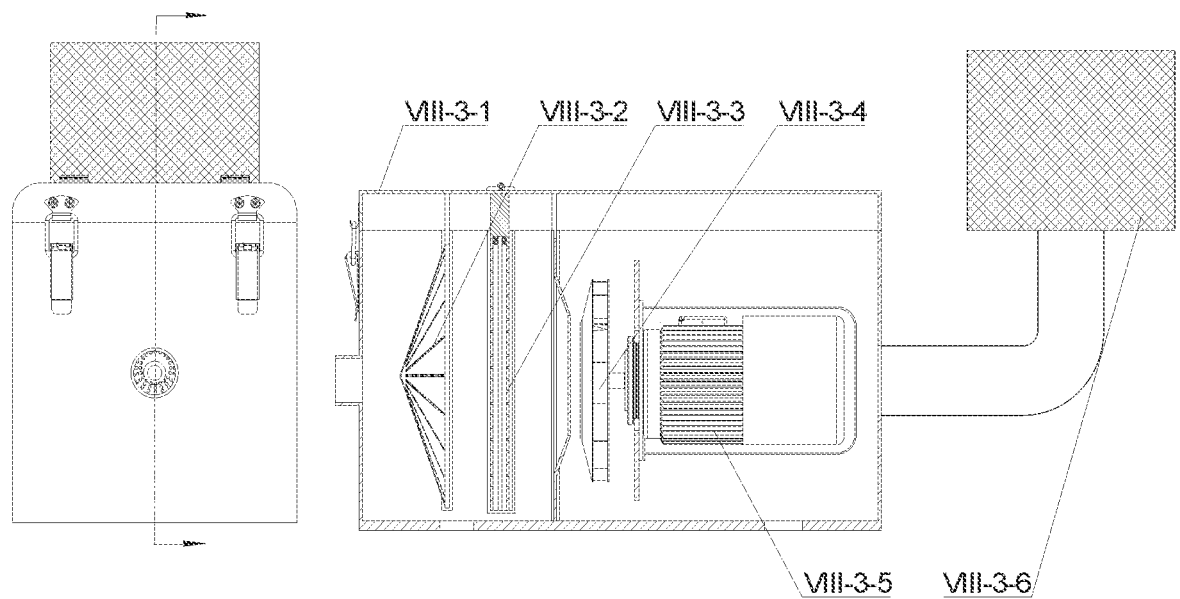
FIG. 29 shows an exploded view of an oil mist collecting mechanism.

As shown in FIG. 26 and FIG. 27, the release agent spraying mechanism includes a spraying mechanism VIII-1, a shell VIII-2, an oil mist collecting mechanism VIII-3 and a recovery mechanism VIII-4.

The mold release agent is first sprayed from the nozzle, and then sprayed on the surface of the belt mold. The unused release agent flows down along a curved surface on a top end of the shell after contacting with the top end of the shell, and then flows into the recovery box along an inclined surface of the shell at a bottom end of the shell. The unused release agent suspended in the shell is sucked into the oil mist collecting box under the action of the oil mist collecting mechanism; and finally, the release agent filtered by the oil mist collecting box and the release agent precipitated at the bottom of the shell flow into the release agent recovery box together.

The spraying mechanism sprays the release agent on the surface and into the cavity of the belt mold by means of a nozzle VIII-2-3. The nozzle VIII-2-3 is fixed on a nozzle supporting plate VIII-2-2. The nozzle supporting plate VIII-2-2 is secured to a nozzle lifting mechanism VIII-2-1 (the lifting mechanism is composed of guide rail sliders) by a bolt. The nozzle lifting mechanism VIII-2-1 is secured on a side plate VIII-1-1 of the shell, and a height of the slider in the lifting mechanism is secured by a tightening handle VIII-2-4, that is, a height of the nozzle is controlled.

The spraying mechanism is secured in the shell by bolt connection, and there will be accumulated oil mist droplets on the surface of the shell, which will flow to the bottom of the shell. There will be suspended oil mist inside the shell. The oil mist floating in the air in the shell may be collected by the oil mist collecting mechanism VIII-3, and a motor VIII-3-5 drives an impeller VIII-3-4 to rotate, sucking the oil mist in the shell into an oil mist collecting box VIII-3-1, and the oil mist entering the box sequentially passes through a porous filter plate VIII-3-2, a filter cotton set VIII-3-3 and a high-efficiency filter cartridge VIII-3-6 for triple filtration, and then enters the recovery mechanism VIII-4 through an oil leakage port of the oil mist collecting box. A middle part of the porous filter plate VIII-3-2 is tapered towards an inlet side of the oil mist collecting box, and the porous filter plate VIII-3-2 is provided with a plurality of rows of filter pores along a generatrix direction thereof.

Figure 30:
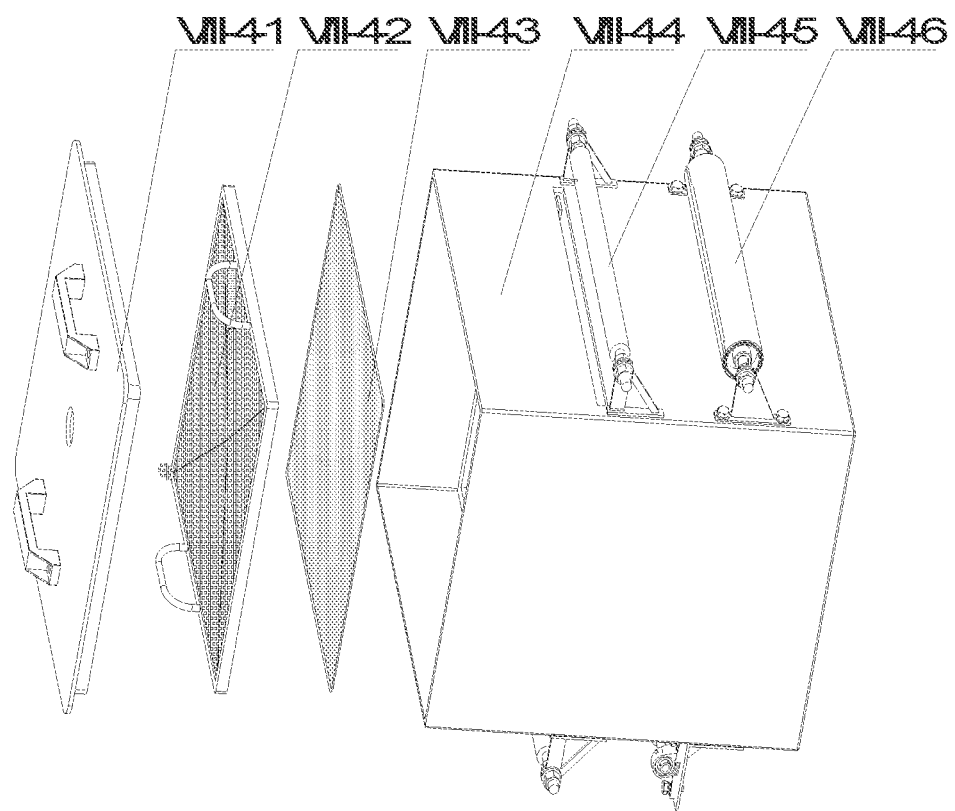
FIG. 30 shows an exploded view of a recovery mechanism.

As shown in FIG. 30, the recovery mechanism VIII-4 includes a recovery box body VIII-4-4. The recovery box body VIII-4-4 is provided with a recovery box cover VIII-4-1. The recovery box cover VIII-4-1 is provided with an oil leakage port, and the release agent recovered from the bottom of the shell and the oil mist collecting mechanism flows into the recovery mechanism. A concave filter screen VIII-4-2 can filter out impurities with large volume in the release agent, and a filter cotton VIII-4-3 can realize secondary filtration. The filter cotton is sleeved on a filter cotton supply roller VIII-4-6, and a used filter cotton can be collected by a filter cotton recovery roller on the other side. A filter cotton carrier roller VIII-4-5 is used for supporting the filter cotton and preventing a filter box from rubbing against the filter cotton to damage the filter cotton.

A filter cotton supporting boss is welded in the recovery box body, and a rubber strip is adhered to the filter cotton supporting boss. The filter cotton passes through a gap between two rubber strips. Under a friction force of the rubber strips, the filter cotton has good stability in the process of working or moving. A filter cotton supply roller is installed on a right side of the recovery box. During operation, an outer ring of the supply roller is wrapped with a circle of filter cotton. Under the rotation of a filter cotton collecting roller in the left side, the outer ring of the filter cotton supply roller rotates to supply filter cotton for the recovery process. Structures and installation methods of the filter cotton carrier roller and the filter cotton supply roller are the same. The filter cotton carrier roller is arranged on two sides of the recovery box and higher than the filter cotton supply roller. Because the filter cotton carrier roller does not need to bear too much load and the space is limited, a ribbed slab of the filter cotton carrier roller can be welded to the recovery box.

Figure 31:
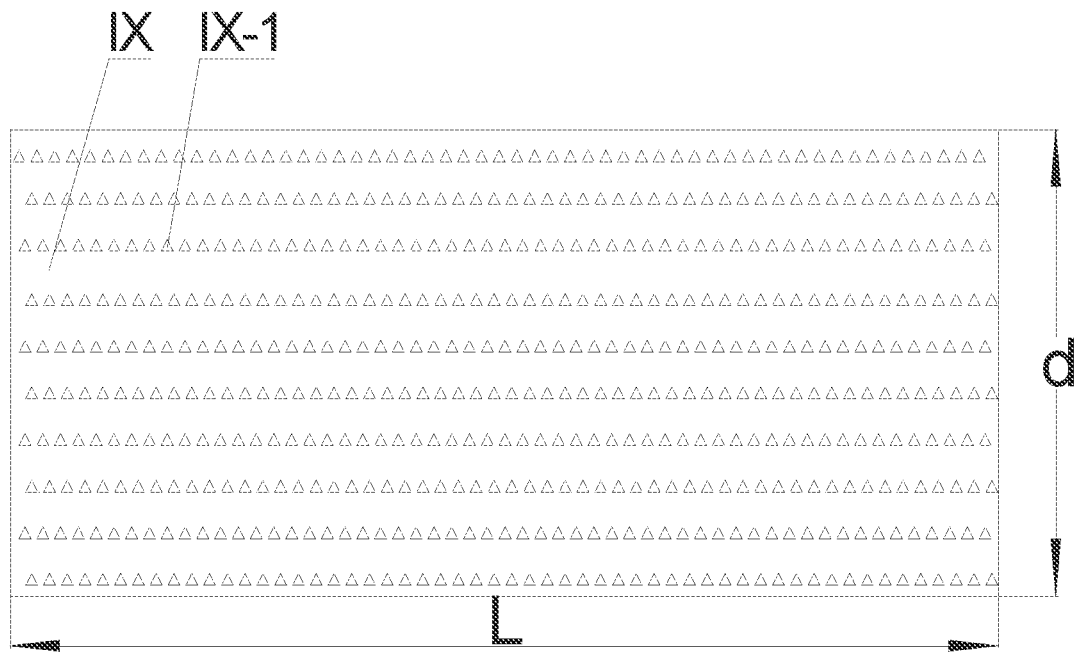
FIG. 31 shows a front view of a belt mold.

As shown in FIG. 31, the belt mold IX has a belt structure, with an abrasive grain cavity IX-1 machined on one side, and wales can be machined on a back side to increase the friction force. The coated CA slurry enters the cavity and is heated by the oven, and the solvent in the slurry volatilizes to form a primary CA abrasive.

Figure 32:
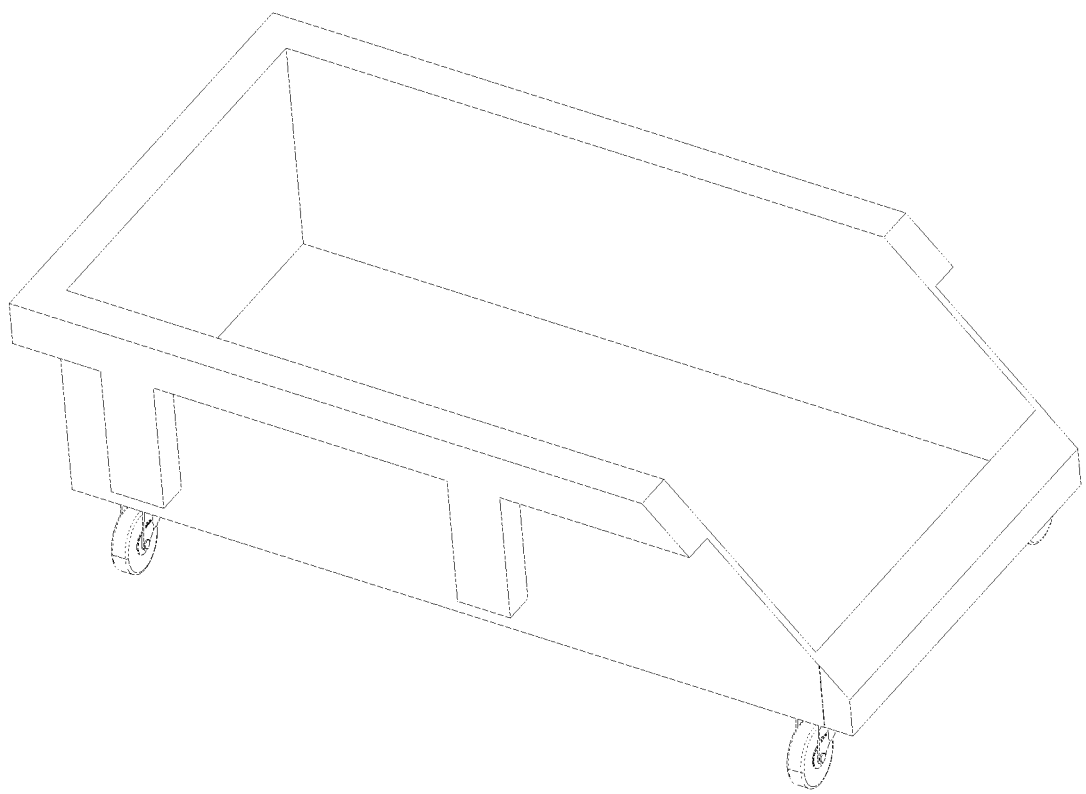
FIG. 32 shows an abrasive grain collecting box.

As shown in FIG. 32, a roller wheel is installed at a bottom of the abrasive grain collecting box. The abrasive grain collecting box is disposed below the separation mechanism and the sweeping mechanism. When the dried abrasive grains in the cavity bypass the driving roller, a part of the abrasive grains will fall down due to the action of gravity, so it is necessary to dispose the abrasive grain collecting box below the driving roller of the belt.

A first process of the production line of the CA abrasive grain is to coat slurry on the surface and into the cavity of the belt mold. The slurry coating mechanism integrates slurry coating and slurry filling functions. An injector coating device is used to realize quantitative and accurate coating of the slurry, and a screw nut mechanism is used to make the coating process stable and fast.

After the slurry coating is completed, the slurry coated on the surface of the belt mold needs to be filled into the cavity.

A damping spring of the scraping mechanism can automatically adjust a pressure applied to the belt mold, and the slurry on the belt mold can be filled into the cavity without damaging the belt mold to obtain a complete abrasive structure.

The slurry filled into the cavity of the belt mold needs to be dried and solidified first. In a third process of the production line, a plurality of rows of ventilation holes are arranged on two sides of the inner oven shell, and a plurality of sets of ventilation holes are also arranged on the top of the shell. Outside air can enter the inner oven shell from two sides of the belt mold and the oven port. The heat source mechanism is configured to dry the slurry. Under the action of the exhaust mechanism, volatile substances are volatilized through the cavity and discharged from the oven.

The slurry dried by the oven is preliminarily solidified into abrasive grains, and the abrasive grains in the cavity are shaken down by vibrating through cam separation in a fourth process of the production line. The separation mechanism is arranged below the oven and above the belt mold. The separation mechanism is provided with a convex piece, and the separation mechanism can rotate so that the convex piece knocks on the belt mold during rotational movement for separation.

There are residual slurry fragments on the surface and in the cavity of the belt mold after separation, and the residual slurry fragments are removed by rolling brush sweeping and air blade purging in a fifth process. The sweeping mechanism further includes a rolling brush. The rolling brush can be rotatably arranged, a rotating direction of the rolling brush is opposite to a moving direction of the belt mold, the rolling brush is arranged at one side of the air blade, and the rolling brush is close to a feeding side direction of the belt mold relative to the air blade. In this way, sweeping can be carried out by the rolling brush first and then carried out by the air blade; and the rolling brush can be arranged below the belt mold and can be arranged along the width direction of the belt mold.

In order to prevent the slurry in next working cycle from adhering to the cavity of the belt mold, which results in difficult separation and increases an integrity of an abrasive grain shape, the last process of the production line uses an aerosol nozzle to spray the release agent for next working cycle. In order to improve a utilization rate of the release agent and prevent air pollution caused by the sprayed release agent floating in the air, a release agent recovery mechanism is designed in this process to recover the release agent in the box and in the air.

Different from an ordinary belt conveyor, this production line has many working procedures and higher requirements for the transmission device. In the process of release agent coating and scraping, a belt supporting device at this station needs to be flat, able to bear a large pressure, and can drive the belt mold to move, so as to reduce the friction damage to the belt mold. According to the present disclosure, the chain plate is adopted for supporting, and symmetrical driving wheels are arranged at the bottom of the chain plate, and the surface of the chain plate can be processed with wales to drive the belt mold to move. The chain plate can bear a pressure of the scraping device. Because the production line is long, the belt mold is different from an ordinary conveyor belt, and has higher requirements on stability and power. Therefore, the synchronous belt driving mechanism is specially designed in the drying process to increase the stability of the belt without increasing the weight of the whole machine.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

The above descriptions are merely preferred embodiments of this application and are not intended to limit this application. For those skilled in the art, this application may have various modifications and changes. Any modification, equivalent replacement, or improvement made without departing from the spirit and principle of this application shall fall within the protection scope of this application.

What is claimed is:

1. A production line of a CA abrasive, comprising:
a belt mold, the belt mold being provided with a cavity;
a transmission device, configured to drive the belt mold to run; wherein the transmission device comprises:
   a driving roller, configured to drive the belt mold to run;
   a chain plate supporting mechanism, arranged below a feeding part of the annular belt mold to support the belt mold;
   a synchronous belt driving mechanism, arranged below the feeding part of the annular belt mold to support the belt mold; and
   a plurality of tension rolls, arranged above a return part of the annular belt mold to tension the belt mold;
a slurry coating mechanism, configured to coat a slurry on a surface and into the cavity of the belt mold;
a slurry scraping mechanism, configured to scrap the slurry coated on the surface of the belt mold into the cavity;
a drying mechanism, configured to dry the belt mold so that the slurry is dried and precipitated into abrasive grains;
a separation mechanism, arranged below the drying mechanism and configured to shake down the abrasive grains in the cavity of the belt mold by vibrating;
a sweeping mechanism, configured to sweep slurry fragments off the belt mold after separation; and
a release agent coating mechanism, configured to spray a release agent to the swept belt mold.

2. The production line of the CA abrasive according to claim 1, wherein the chain plate supporting mechanism comprises a plurality of chain plates which are sequentially connected into an annular structure, surfaces of the chain plates are provided with wales, the chain plates are arranged in parallel with the surface of the belt mold, and a plurality of driving wheels are arranged in an annular ring of the annular structure; and
the synchronous belt driving mechanism comprises a plurality of rows of connected synchronous belt mechanisms, each synchronous belt mechanism is provided with a plurality of synchronous belts in parallel, the synchronous belts of the adjacent synchronous belt mechanisms are distributed crosswise, and the synchronous belts are arranged in parallel with the surface of the belt mold.

3. The production line of the CA abrasive according to claim 1, wherein the slurry coating mechanism comprises an injector for injecting slurry into the belt mold, the injector can move up, down, left and right, and the injector comprises a syringe, a side part of the syringe is provided with a slurry inlet, a bottom side of the syringe is provided with a slurry outlet, an injector piston is arranged in the syringe, and the injector piston is connected with a linear propulsion component.

4. The production line of the CA abrasive according to claim 1, wherein the slurry scraping mechanism comprises a scraping master support and a scraping plate, the scraping plate is connected with the scraping master support through a suspension component so that the scraping plate is suspended, and a damping spring is arranged in the suspension component; and the scraping plate comprises a triangular supporting plate and scrapers fixed at a lower part of the triangular supporting plate, a long side of the triangular supporting plate is arranged along a length direction of the scraping master support; the scrapers are V-shaped scrapers which are arranged at lower parts of the two short sides of the triangular supporting plate; a bottom side of the scraper is a plane, and a longitudinal section of the scraper is a rectangle with one side missing corners.

5. The production line of the CA abrasive according to claim 1, wherein the drying mechanism comprises an oven, the oven comprises an inner oven shell and an outer oven shell, the outer oven shell is arranged outside the inner oven shell, and the inner oven shell and the outer oven shell are connected with each other, a cavity is formed between the inner oven shell and the outer oven shell, and the inner oven shell is provided with a ventilation hole, so that an interior of the inner oven shell is communicated with an exhaust mechanism through the ventilation hole and the cavity, the exhaust mechanism is connected with the oven, and the inner oven shell can be arranged across the belt mold for the belt mold to move conveniently; and the interior of the inner oven shell is provided with a heat source mechanism, and a protective cover is installed below the heat source mechanism on an inner surface of the inner oven shell; a plurality of sets of the heat source mechanisms are comprised, each set is fix on the inner oven shell, and each set of heat source mechanisms comprises a plurality of lamps.

6. The production line of the CA abrasive according to claim 1, wherein the separation mechanism comprises a rotatable convex piece, and the convex piece can be arranged above the belt mold, so that the convex piece knocks on the belt mold during rotational movement for separation; and the separation mechanism comprises at least one set of convex piece separation mechanism, the convex piece separation mechanism comprises a rotating shaft, the rotating shaft is provided with a plurality of convex pieces, and setting angles of two adjacent convex pieces of each camshaft are the same or different; and an abrasive grain collecting box is arranged below the separation mechanism.

7. The production line of the CA abrasive according to claim 1, wherein the sweeping mechanism comprises a rolling brush and an air blade capable of blowing air to the belt mold and the cavity thereof, the air blade is provided with an air outlet for blowing air, and an angle of the air blade is adjustable; the rolling brush can be rotatably arranged, the rolling brush is arranged at one side of the air blade, the rolling brush is close to a feeding side direction of the belt mold relative to the air blade, and the rolling brush can be arranged below the belt mold and along a width direction of the belt mold; and an abrasive grain collecting box is arranged below the sweeping mechanism.

8. The production line of the CA abrasive according to claim 1, wherein the release agent coating mechanism comprises a shell, two sides of the shell are provided with openings for the belt mold to pass through, at least one nozzle for spraying atomized release agent to the belt mold is installed in the shell, the shell is connected with an oil mist collecting mechanism, the oil mist collecting mechanism comprises a sucking component arranged in an oil mist collecting box, and one side of the sucking component in the oil mist collecting box is provided with a filter layer; and a bottom of the shell is connected with a recovery mechanism, the recovery mechanism is connected with the oil mist collecting mechanism, the recovery mechanism comprises a recovery box, a first filter cotton is arranged in the recovery box, the first filter cotton can move relative to the recovery box, and the recovery box is provided with a first filter cotton moving port; and a concave filter screen is installed above the first filter cotton in the recovery box to filter impurities in the release agent.

9. The production line of the CA abrasive according to claim 8, wherein an air deflector is arranged on one side of the sucking component in the oil mist collecting mechanism, the air deflector is provided with an air port, the filter layer is arranged on the other side of the air deflector opposite to the sucking component, the filter layer comprises a first filter plate and a second filter cotton which are sequentially arranged from an inlet of the oil mist collecting box to the air deflector, the second filter cotton is fixed on a filter screen shell through a filter cotton clip, and the oil mist collecting box is provided with a first oil leakage port below the filter layer.

* * * * *